United States Patent
Ueda et al.

(10) Patent No.: US 10,244,477 B2
(45) Date of Patent: Mar. 26, 2019

(54) COMMUNICATION APPARATUS, COMMUNICATION TERMINAL, AND COMMUNICATION SYSTEM

(71) Applicants: Shigeo Ueda, Kanagawa (JP); Takayasu Oe, Kanagawa (JP)

(72) Inventors: Shigeo Ueda, Kanagawa (JP); Takayasu Oe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/661,302

(22) Filed: Jul. 27, 2017

(65) Prior Publication Data
US 2018/0035377 A1 Feb. 1, 2018

(30) Foreign Application Priority Data

Aug. 1, 2016 (JP) .................. 2016-151515
Jul. 10, 2017 (JP) .................. 2017-135005

(51) Int. Cl.
*H04M 1/00* (2006.01)
*H04W 52/02* (2009.01)
*H04W 76/25* (2018.01)

(52) U.S. Cl.
CPC ....... *H04W 52/0235* (2013.01); *H04W 76/25* (2018.02)

(58) Field of Classification Search
CPC .............. H04W 4/80; H04W 28/0221; H04W 52/0258; H04W 52/0274; H04W 52/0235; H04M 1/73; H04M 1/7253

USPC .... 455/41.1, 41.2, 552.1, 553.1, 556.1, 557, 455/574
See application file for complete search history.

(56) References Cited

U.S. PATENT DOCUMENTS

| | | | |
|---|---|---|---|
| 8,005,057 B2 * | 8/2011 | Lim | G06Q 30/0261 370/338 |
| 9,625,975 B2 | 4/2017 | Hasui | |
| 9,774,759 B2 * | 9/2017 | Tsuzuki | H04N 1/4413 |
| 2014/0378052 A1 * | 12/2014 | Hamada | G06F 1/3225 455/41.1 |

(Continued)

FOREIGN PATENT DOCUMENTS

| | | |
|---|---|---|
| JP | 2004-096495 | 3/2004 |
| JP | 2012-138783 | 7/2012 |

(Continued)

*Primary Examiner* — Quochien B Vuong
(74) *Attorney, Agent, or Firm* — IPUSA, PLLC

(57) ABSTRACT

A communication apparatus includes a wireless module configured to execute communication with a communication terminal; a host system including a communication controller configured to control the communication with the communication terminal executed by the wireless module; an updater configured to update information used for the communication, at predetermined updating timings; and an operation status controller configured to control an operation state. The communication apparatus further includes a subsystem configured to send, to the operation status controller, a report indicating that an updating time period has elapsed from the updating timing of the information. The operation status controller causes the host system to return to a regular mode, upon receiving the report indicating that the updating time period has elapsed while the host system is in an energy saving mode.

11 Claims, 18 Drawing Sheets

(56) References Cited

U.S. PATENT DOCUMENTS

| | | | |
|---|---|---|---|
| 2015/0172906 A1 | 6/2015 | Terazaki et al. | |
| 2016/0255673 A1* | 9/2016 | Yasuda | H04W 84/20 |
| | | | 455/41.2 |
| 2016/0364275 A1* | 12/2016 | Miyazaki | H04L 43/0811 |
| 2017/0223748 A1* | 8/2017 | Sumiuchi | H04W 76/02 |

FOREIGN PATENT DOCUMENTS

| | | |
|---|---|---|
| JP | 2014-197333 | 10/2014 |
| JP | 2015-119296 | 6/2015 |

* cited by examiner

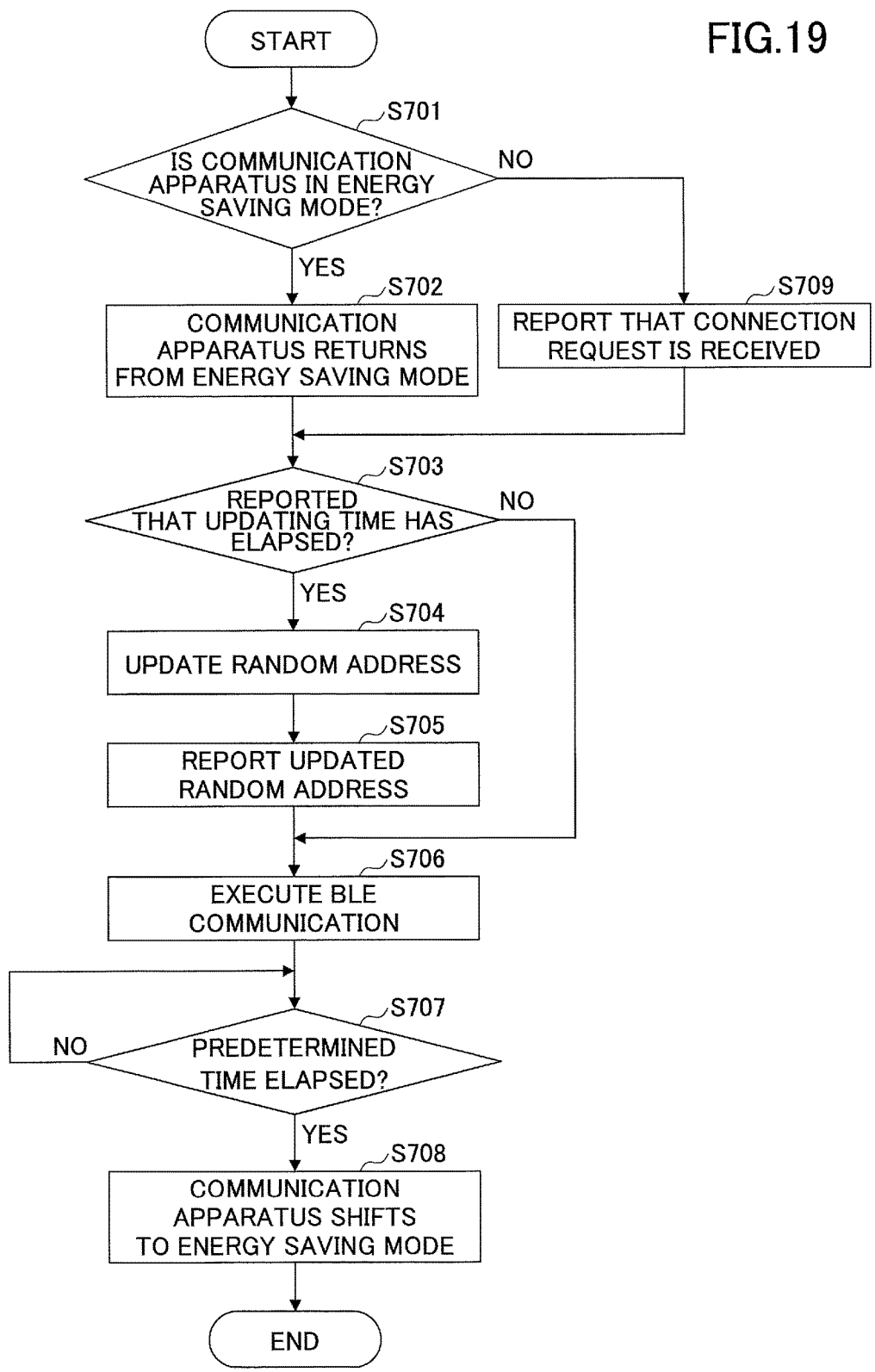

COMMUNICATION APPARATUS, COMMUNICATION TERMINAL, AND COMMUNICATION SYSTEM

CROSS-REFERENCE TO RELATED APPLICATION

The present application claims priority under 35 U.S.C. § 119 to Japanese Patent Application No. 2016-151515, filed on Aug. 1, 2016 and Japanese Patent Application No. 2017-135005, filed on Jul. 10, 2017, the contents of which are incorporated herein by reference in their entirety.

BACKGROUND OF THE INVENTION

1. Field of the Invention

The present invention relates to a communication apparatus, a communication terminal, and a communication system.

2. Description of the Related Art

In the background art, there is a known Multi-Function Peripheral (MFP) in which a Bluetooth Low Energy (BLE) device is installed as a communication apparatus. In BLE, in order to increase security, the Advertiser's Address (AdvA) is required to be updated at predetermined timings.

Patent Document 1: Japanese Unexamined Patent Application Publication No. 2015-119296

SUMMARY OF THE INVENTION

An aspect of the present invention provides a communication apparatus, a communication terminal, and a communication system, in which one or more of the disadvantages of the related art are reduced.

According to one aspect of the present invention, there is provided a communication apparatus including a wireless module configured to execute communication with a communication terminal; a host system including a communication controller configured to control the communication with the communication terminal executed by the wireless module; an updater configured to update information used for the communication, at predetermined updating timings; and an operation status controller configured to control an operation state, the communication apparatus further including a sub-system configured to send, to the operation status controller, a report indicating that an updating time period has elapsed from the updating timing of the information, wherein the operation status controller causes the host system to return to a regular mode, upon receiving the report indicating that the updating time period has elapsed while the host system is in an energy saving mode.

BRIEF DESCRIPTION OF THE DRAWINGS

FIG. 19 is a flowchart of an example of a process executed by the communication apparatus according to the fifth embodiment of the present invention.

DETAILED DESCRIPTION OF THE PREFERRED EMBODIMENTS

Figure 1:
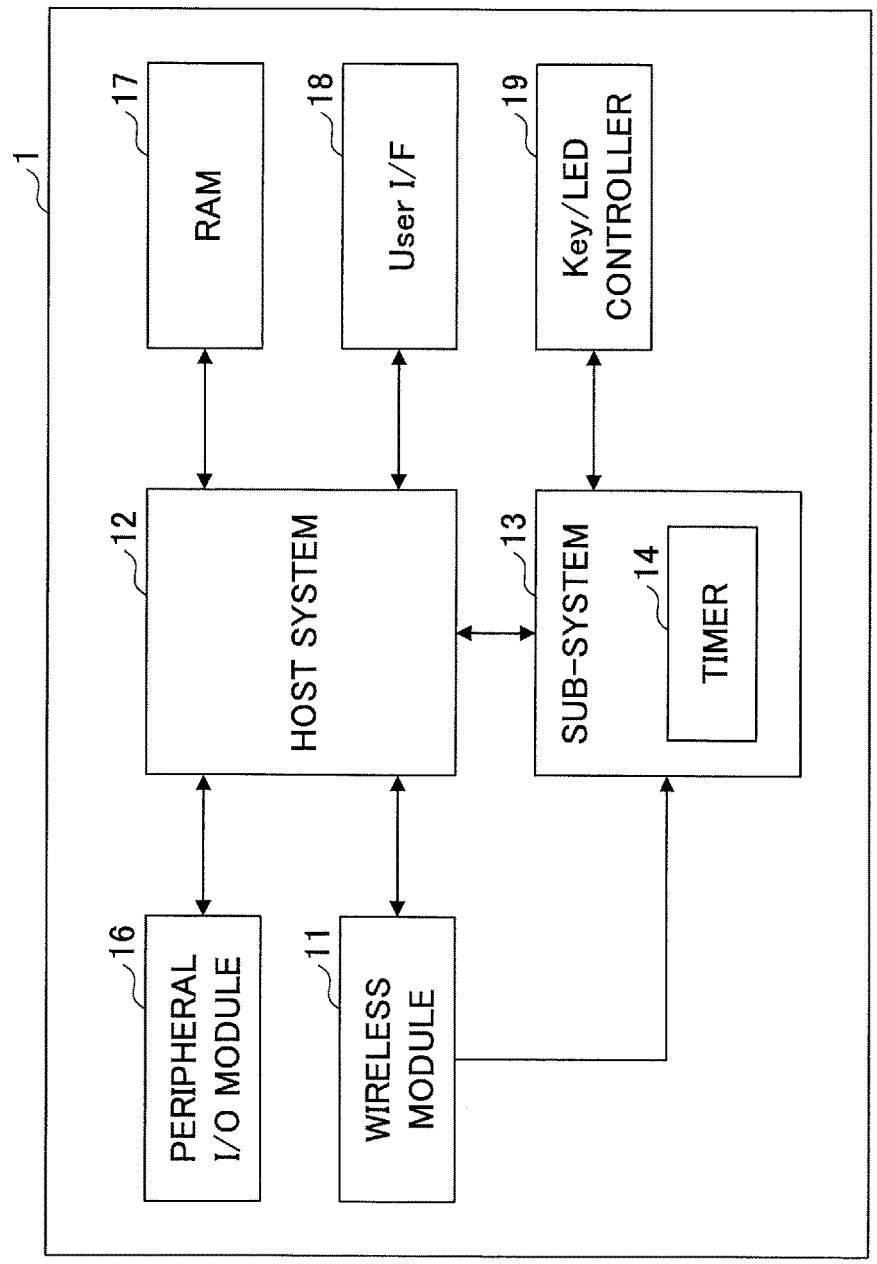
FIG. 1 is an example of a hardware block diagram of a communication apparatus according to a first embodiment of the present invention.

When the BLE device of the related art is in an energy saving mode, the operations of a control device of the BLE device are also stopped. Therefore, the AdvA cannot be updated, and BLE communication cannot be executed during the energy saving mode. Said differently, the BLE device of the related art cannot shift to the energy saving mode when the BLE device is to execute BLE communication.

A problem to be solved by an embodiment of the present invention is to provide a communication apparatus, a communication terminal, and a communication system that are capable of shifting to an energy saving mode and also capable of executing BLE communication.

Embodiments of the present invention will be described by referring to the accompanying drawings. In the specification and drawings of the embodiments, the elements having substantially the same functions are denoted by the same reference numerals, and overlapping descriptions are omitted.

First Embodiment

A description is given of a communication apparatus 1 according to a first embodiment, by referring to FIGS. 1 through 8. The communication apparatus 1 according to the present embodiment is a BLE device capable of performing BLE communication. The communication apparatus 1 can be installed in any device that requires a wireless communication function. This communication apparatus 1 functions as a peripheral device of BLE. The communication apparatus 1 can be connected to another communication apparatus, which is functioning as a central device of BLE, and can perform communication with the other communication apparatus. The other communication apparatus is, for example, a smartphone, a mobile phone, a notebook personal computer (PC), a tablet terminal, and a client PC, etc. In the following, the other communication apparatus is referred to as a communication terminal 2. For example, the communication apparatus 1 according to the present embodiment is installed in an MFP, and is used for performing user authentication of a user of the communication terminal 2. Furthermore, the communication apparatus 1 is used for sending and receiving status information of the MFP.

First, a description is given of the configuration of the communication apparatus 1 according to the present embodiment. FIG. 1 is an example of a hardware block diagram of the communication apparatus 1 according to the present embodiment. The communication apparatus 1 of FIG. 1 includes a wireless module 11, a host system 12, a sub-system 13, and a timer 14. Furthermore, the communication apparatus 1 includes a peripheral input/output (I/O) module 16, a Random Access Memory (RAM) 17, a user interface (I/F) 18, and a key/Light Emitting Diode (LED) controller 19.

The wireless module 11 is an Integrated Circuit (IC) capable of performing BLE communication with the communication terminal 2, in which firmware is mounted. BLE communication means wireless communication complying with BLE that is a wireless communication standard. The wireless module 11 may be a combo module capable of performing communication according to a wireless communication standard other than BLE (for example, Wi-Fi (registered trademark) and Bluetooth (registered trademark). The wireless module 11 constantly operates in a regular mode, and does not shift to an energy saving mode.

The host system 12 controls operations of the entire communication apparatus 1, including BLE communication by the wireless module 11. The host system 12 is formed of a microcomputer and System on Chip (SoC).

Figure 2:
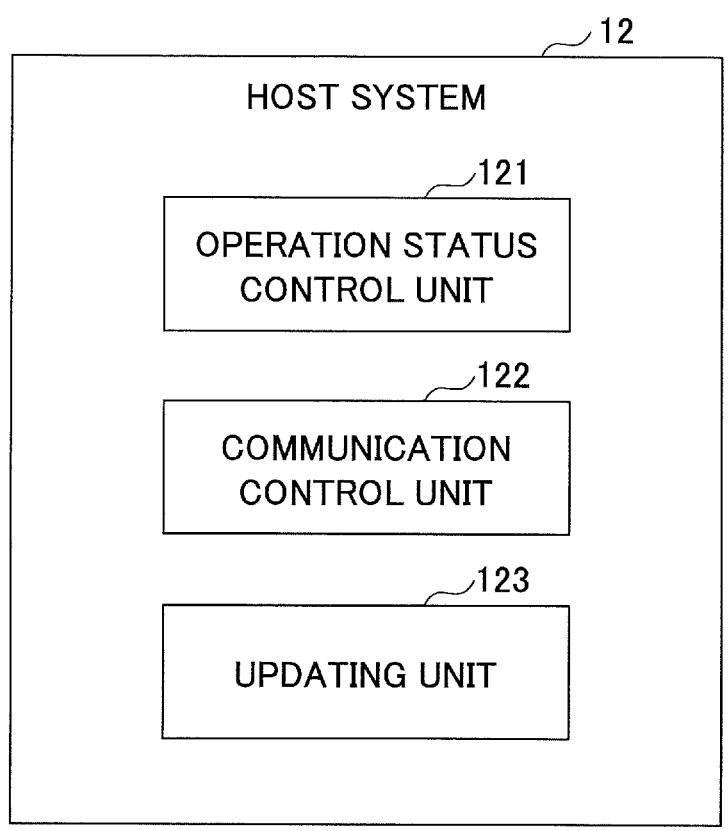
FIG. 2 is an example of a functional block diagram of a host system according to the first embodiment of the present invention.

FIG. 2 is an example of a functional block diagram of the host system 12. The host system 12 of FIG. 2 includes an operation status control unit 121, a communication control unit 122, and an updating unit 123. These functional elements may be implemented as the host system 12 executes software, or may be implemented by hardware (for example, an integrated circuit (IC) installed in the host system 12).

The operation status control unit 121 controls the operation status of the elements (however, excluding the wireless module 11, the sub-system 13, and the timer 14) of the communication apparatus 1. Specifically, the operation status control unit 121 controls the shifting from the regular mode to the energy saving mode, and the returning to the regular mode from the energy saving mode. The regular mode is an operation status in which regular operations are possible. The energy saving mode is an operation status in which at least one of the functions is stopped, and in which the power consumption is low.

The operation status control unit 121 causes the elements of the communication apparatus 1 to shift from the regular mode to the energy saving mode, for example, when input from a user (the user I/F 18) or a connection request from the communication terminal 2, is not received for more than a predetermined time period. The operation status control unit 121 monitors the measurement time of the timer 14 to measure the predetermined time period. Furthermore, the operation status control unit 121 causes the elements of the communication apparatus 1 to return to the regular mode from the energy saving mode, for example, when an input from the user (user I/F 18) or a connection request from the communication terminal 2, is received. The operation status control unit 121 accepts a wake-up interruption from the sub-system 13, while the host system 12 is in the energy saving mode. That is, while the host system 12 is in the energy saving mode, the operation status control unit 121 operates in a regular mode, whereas the communication control unit 122 and the updating unit 123 are stopped.

The communication control unit 122 controls the BLE communication with the communication terminal 2, by the wireless module 11.

The updating unit 123 updates the information used for BLE communication, at predetermined updating timings, and reports the updated information to the wireless module 11. The updating timing is, for example, every 15 minutes (updating time period); however, the updating timing is not limited as such. The information used for BLE communication includes the AdvA of BLE, and the updating unit 123 updates the AdvA. The updating unit 123 may also update other information, together with the AdvA. Note that details of the AdvA are described later.

The sub-system 13 monitors the operation status of the entire communication apparatus 1. When an updating time period has elapsed from the updating timing of updating the AdvA, the sub-system 13 reports that the updating time period of AdvA has elapsed, to the operation status control unit 121. The sub-system 13 constantly operates in the regular mode, and does not shift to the energy saving mode. The sub-system 13 is formed of a microcomputer in which in which firmware is mounted, and SoC.

The timer 14 is a timer for measuring the elapsed time from the updating timing of AdvA. The timer 14 may be implemented by software or hardware. The timer 14 constantly operates in the regular mode, and does not shift to the energy saving mode. In the present embodiment, the timer 14 is provided in the sub-system 13, and the timer 14 is implemented by, for example, a Real Time Clock (RTC), etc., installed in the sub-system 13.

The peripheral I/O module 16 is an input output interface for connecting to an external device according to a communication standard other than BLE, such as Universal Serial Bus (USB) and Ethernet (registered trademark).

The RAM 17 provides a work space for the host system 12. The RAM 17 is, for example, a Dynamic RAM (DRAM), a Static RAM (SRAM), and a flash memory, etc.

The user I/F 18 is an input output device such as operation buttons (keys), a touch panel, a display, a mouse, and a keyboard, etc. The user I/F 18 may be an input output device of a device in which the communication apparatus 1 is installed (for example, an operation panel of the MFP).

The key/LED controller 19 is a controller for controlling operation buttons and LEDs, included in the communication apparatus 1 and the device in which the communication apparatus 1 is installed. In the example of FIG. 1, the key/LED controller 19 is controlled by the sub-system 13.

Figure 3:
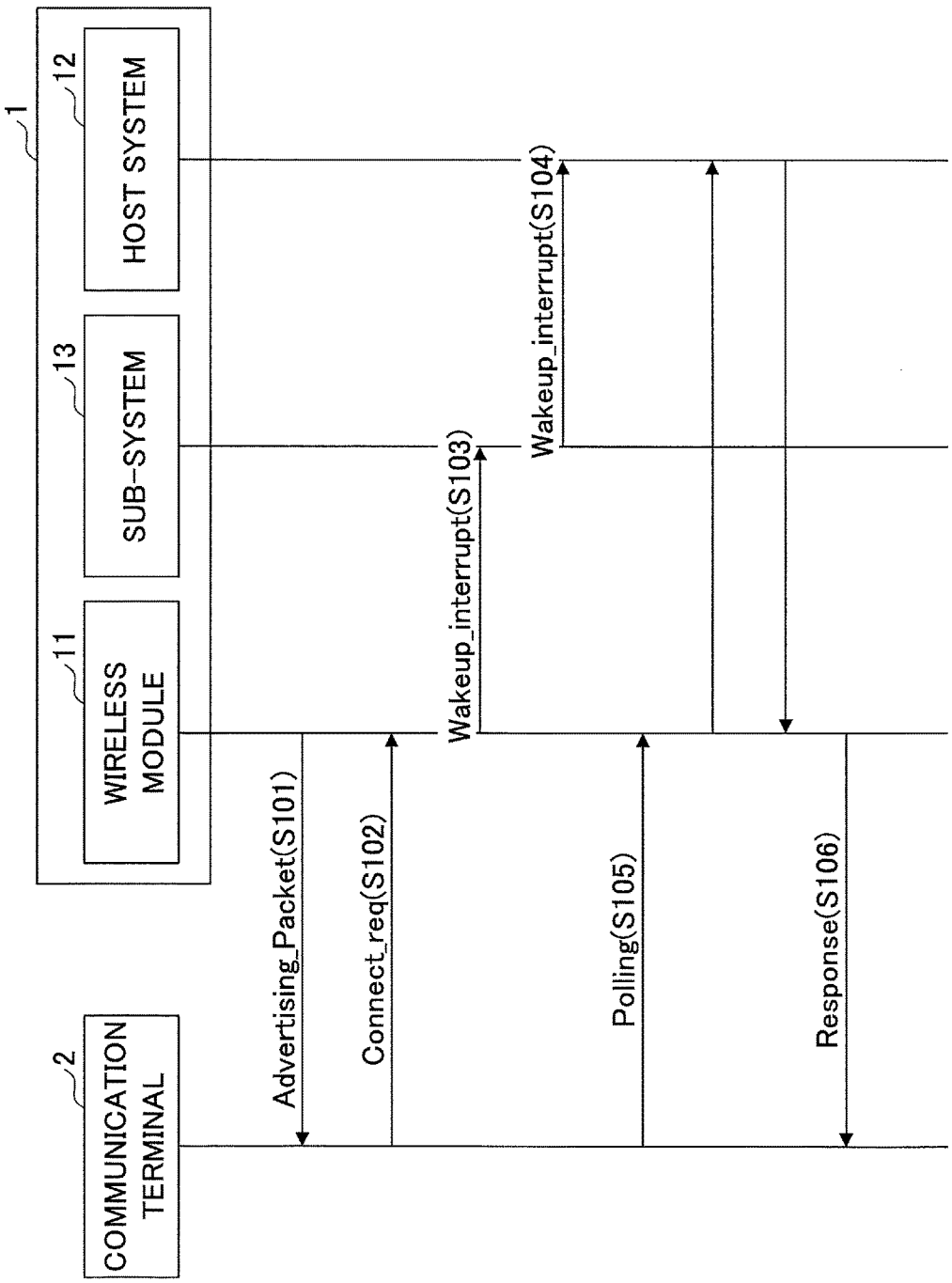
FIG. 3 is a sequence diagram of BLE communication between the communication apparatus and a communication terminal according to the first embodiment of the present invention.

Next, a description is given of the BLE communication between the communication apparatus 1 and the communication terminal 2 according to the present embodiment. FIG. 3 is a sequence diagram of BLE communication between the communication apparatus 1 and the communication terminal 2. In the example of FIG. 3, at the sequence starting time point, it is assumed that information, such as AdvA used in BLE communication, has been reported to the wireless module 11. Furthermore, at the sequence starting time point, it is assumed that the host system 12 is in the energy saving mode and the wireless module 11 and the sub-system 13 are in the regular mode.

While the communication apparatus 1 is operating, the wireless module 11 periodically transmits advertising packets (Advertising_Packet:AdvP) (step S101). When the communication terminal 2 approaches the communication apparatus 1 up to a distance where communication is possible with the communication apparatus 1, the communication terminal 2 receives the AdvP, and determines whether to communicate with the communication apparatus 1 based on the received AdvP.

When the communication terminal 2 determines to communicate with the communication apparatus 1, the communication terminal 2 returns a connection request (Connect_req) (step S102). When the wireless module 11 receives this connection request, the wireless module 11 issues a wake-up interruption (Wakeup_interrupt) to the sub-system 13 that is operating in the regular mode (step S103).

When the sub-system 13 accepts the wake-up interruption from the wireless module 11, the sub-system 13 issues a wake-up interruption (Wakeup_interrupt) to the operation status control unit 121 (step S104). When the operation status control unit 121 accepts the wake-up interruption, the operation status control unit 121 causes the host system 12 (the communication control unit 122 and the updating unit 123) to return to the regular mode from the energy saving mode. The communication terminal 2 performs polling until the host system 12 returns to the regular mode (step S105).

When the host system 12 returns to the regular mode, the communication control unit 122 sends a response (Response) to the communication terminal 2 via the wireless module 11 (step S106). When the communication terminal 2 receives the response, the communication terminal 2 determines that a communicative connection with the communication apparatus 1 has been established, and subsequently executes BLE communication.

Note that when the host system 12 is in the regular mode at the sequence starting time point, and the wireless module 11 receives a connection request from the host system 12, the wireless module 11 reports the connection request to the host system 12. Then, the communication control unit 122 sends a response to the communication terminal 2 via the wireless module 11, in response to the report. In this case, the wireless module 11 does not have to issue a wake-up interruption to the sub-system 13. Furthermore, the wireless module 11 may issue a wake-up interruption to the sub-system 13, but the sub-system 13 may ignore this wake-up interruption.

Next, a description is given of the AdvA. The AdvP transmitted by the communication apparatus 1 includes an Access Address, a header (Adv PDU Header), Advertiser's data (AdvData), and the AdvA, etc.

The Access Address is an address of the transmission source (the communication apparatus 1), and in the case of the AdvP, the Access Address is a fixed value. The header indicates the type of the advertising and the data length of the payload (AdvA and AdvData). The AdvData indicates a function of the BLE communication used by the transmission source of the AdvP.

The AdvA is an address of the transmission source (the communication apparatus 1). There are two types of AdvA, that is, a public address and a random address. The type of the AdvA is identified by the value of TxAdd included in the header. In the present embodiment, it is assumed that the AdvA is a random address (TxAdd=1). In the following, the AdvA is simply referred to as a "random address".

Figure 4:
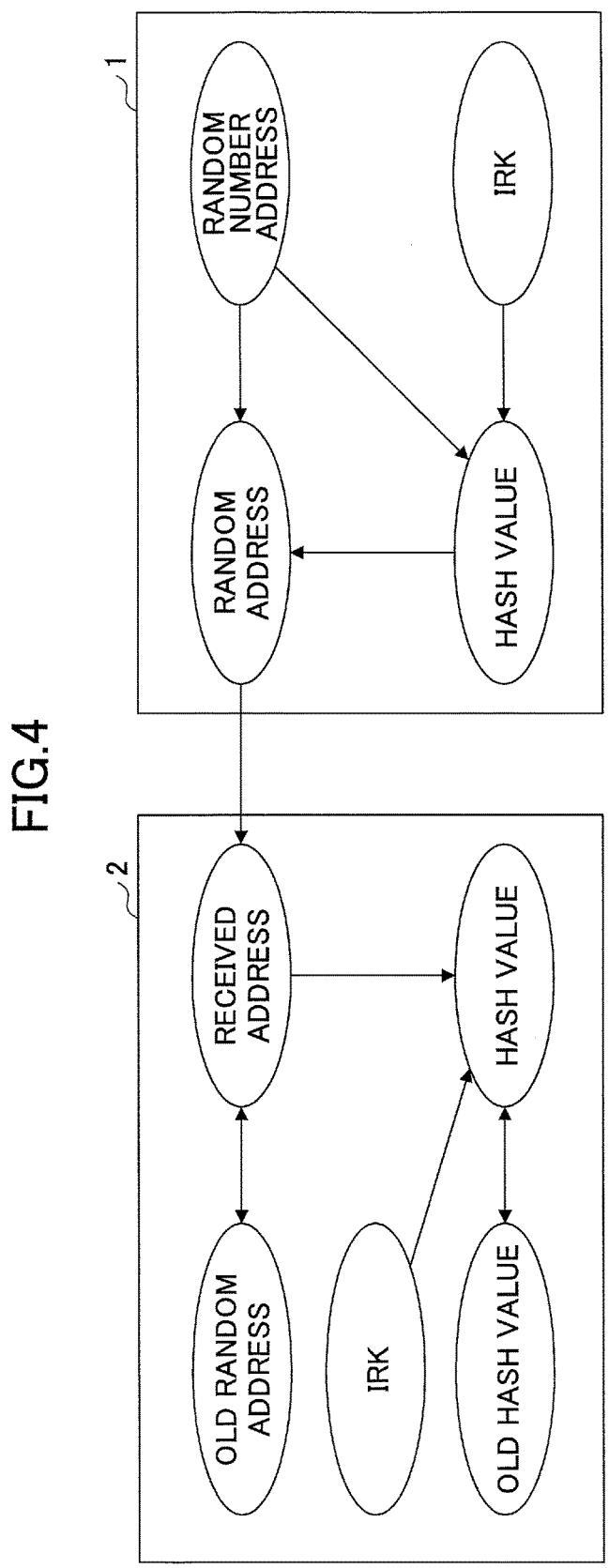
FIG. 4 is a diagram for describing a random address in BLE according to the first embodiment of the present invention.

FIG. 4 is a diagram for describing a random address in BLE. As illustrated in FIG. 4, a random address of the communication apparatus 1 is generated based on a random number address that is randomly generated, and a hash value. The hash value is generated based on the random number address and an Identify Resolving Key (IRK). The IRK is a unique value of the communication apparatus 1. The communication apparatus 1 generates a new random number address at predetermined updating timings, and generates a new random address based on the generated random number address. Accordingly, the random address of the communication apparatus 1 is updated at updating timings. As described above, the random address is updated by the updating unit 123.

When the communication apparatus 1 is connected to the communication terminal 2, the communication apparatus 1 sends the IRK of the communication apparatus 1 to the communication terminal 2. The communication terminal 2 stores, in a memory, the IRK received from the communication apparatus 1 connected to the communication terminal 2. Furthermore, the communication terminal 2 stores, in a memory, the random address and the hash value received from the communication apparatus 1 connected to the communication terminal 2.

Here, a case where the connection between the communication apparatus 1 and the communication terminal 2 is disconnected for some reason, is considered. When the connection is disconnected, the communication apparatus 1 transmits an AdvP including a random address (AdvA). When the communication terminal 2 receives this AdvP, the communication terminal 2 compares the random address (received address) included in the AdvP, and the random address (old address) stored in the memory. When the two random addresses match each other, the communication terminal 2 determines that the communication apparatus 1, which has transmitted the AdvP, is the communication apparatus 1 with which the connection has been disconnected, and connects with this communication apparatus 1.

Conversely, when the two random addresses do not match each other, the communication terminal 2 calculates a hash value based on the IRK of the communication apparatus 1 with which the connection has been disconnected, and the received address. Then, the communication terminal 2 compares the hash value obtained by the calculation, with the hash value stored in the memory (old hash value). When the two hash values match each other, the communication terminal 2 determines that the communication apparatus 1, which has transmitted the AdvP, is the communication apparatus 1 with which the connection has been disconnected, and connects with this communication apparatus 1.

As described above, even when the random address of the communication apparatus 1 is updated while the connection with the communication apparatus 1 is disconnected, the communication terminal 2 is able to identify the communication apparatus 1 and connect with the communication apparatus 1.

Figure 5:
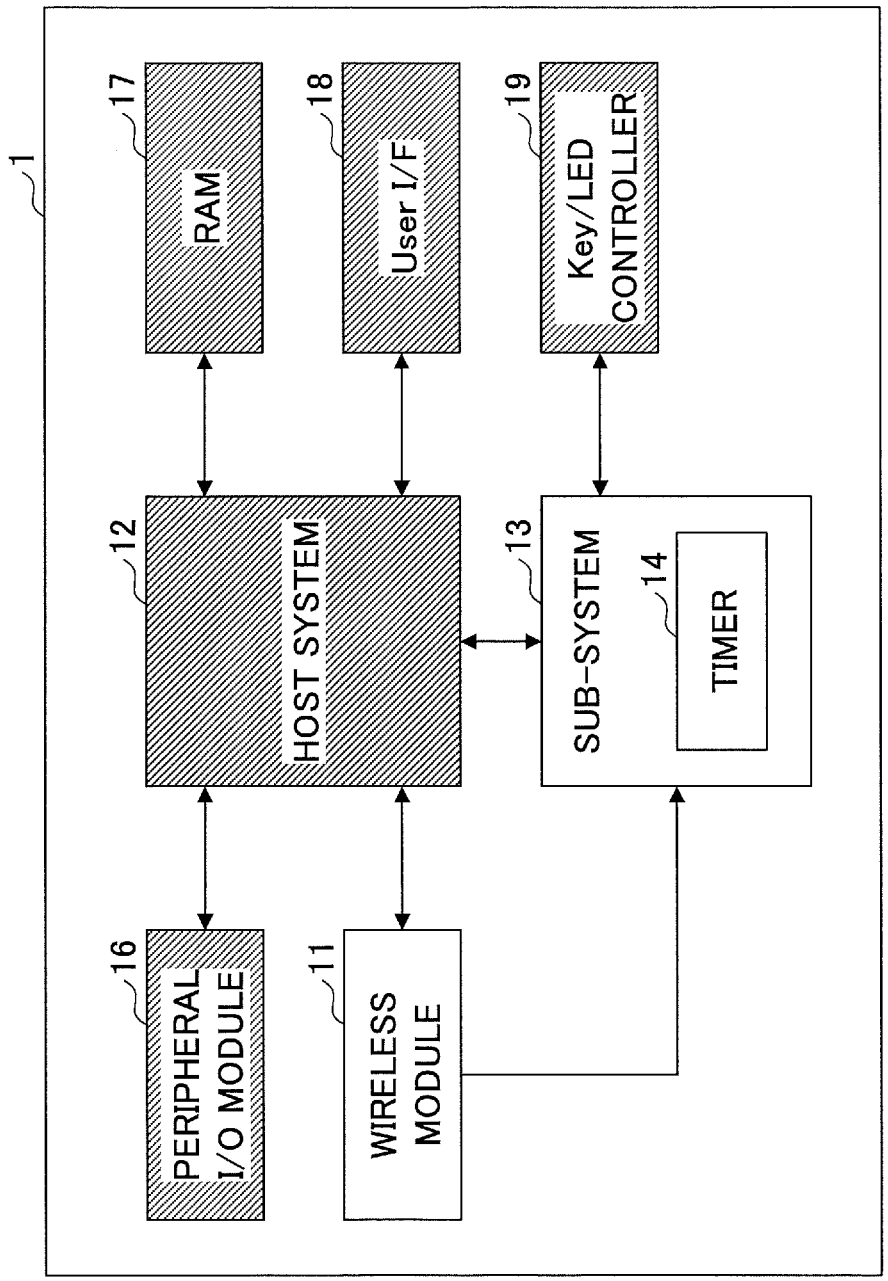
FIG. 5 illustrates an example of the configuration of the communication apparatus in the energy saving mode according to the first embodiment of the present invention.

Next, a description is given of the energy saving mode of the communication apparatus 1. FIG. 5 illustrates an example of the configuration of the communication apparatus 1 in the energy saving mode. In the example of FIG. 5, the elements shaded with diagonal lines are in the energy saving mode, and the elements that are not shaded with diagonal lines are in the regular mode.

In the present embodiment, as illustrated in FIG. 5, when the communication apparatus 1 is in the energy saving mode, the wireless module 11, the sub-system 13, and the timer 14 are operating in the regular mode. Conversely, the host system 12, the peripheral I/O module 16, the RAM 17, the user I/F 18, and the key/LED controller 19 are operating in the energy saving mode.

The host system 12 in the energy saving mode only accepts a wake-up interruption from the sub-system 13 by the operation status control unit 121, and the other functions of the host system 12 (the communication control unit 122 and the updating unit 123) are stopped.

The peripheral I/O module 16, the user I/F 18, and the key/LED controller 19, which are in the energy saving mode, may stop functioning while the power of these elements is on, or the power of these elements may be off.

When the RAM 17 is a volatile memory, the RAM 17 operates in a self-refresh mode, and when the RAM 17 is a non-volatile memory, the power of the RAM 17 is off.

Note that even while the communication apparatus 1 is in the energy saving mode, the wireless module 11 periodically transmits the AdvP. Furthermore, the sub-system 13 accepts a wake-up interruption from the wireless module 11. Furthermore, the timer 14 continues measuring the time.

Next, a description is given of operations of the communication apparatus 1 according to the present embodiment. In the following, a description is given of a process of updating the random address by the communication apparatus 1 and a communication process by the communication apparatus 1.

Figure 6:
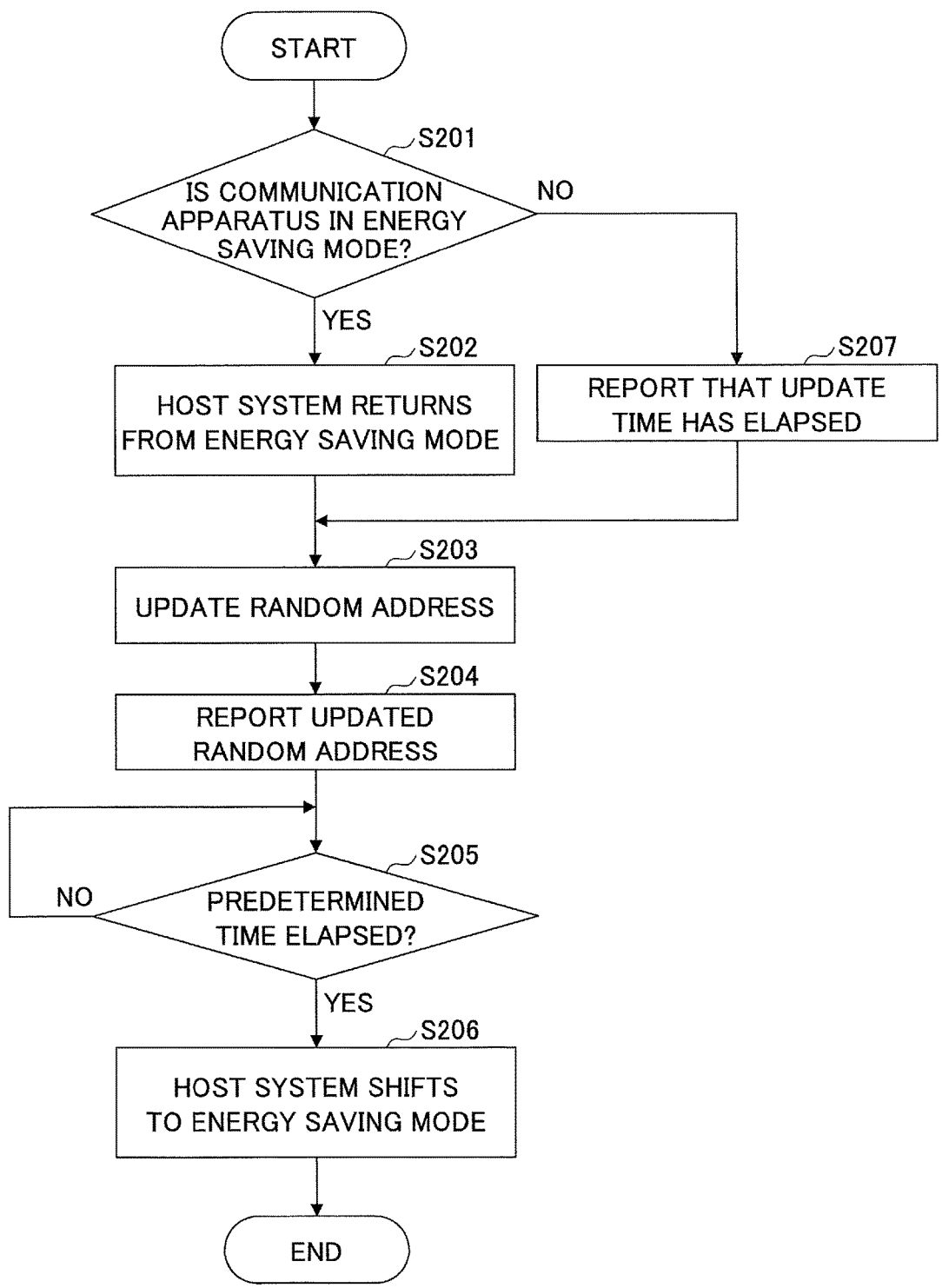
FIG. 6 is a flowchart of an example of a process of updating the random address according to the first embodiment of the present invention.

FIG. 6 is a flowchart of an example of a process of updating the random address by the communication apparatus 1 according to the present embodiment. The sub-system 13 monitors the measurement time of the timer 14, and when a predetermined updating time period has elapsed from the previous updating timing, the updating process of FIG. 6 is started.

When the communication apparatus 1 is in the energy saving mode at the starting time point of the updating process (YES in step S201), the sub-system 13 issues a wake-up interruption to the operation status control unit 121, and the operation status control unit 121 causes the host system 12 to return to the regular mode from the energy saving mode (step S202). Issuing a wake-up interruption corresponds to reporting that an updating time period has elapsed from the previous updating timing.

Figure 7:
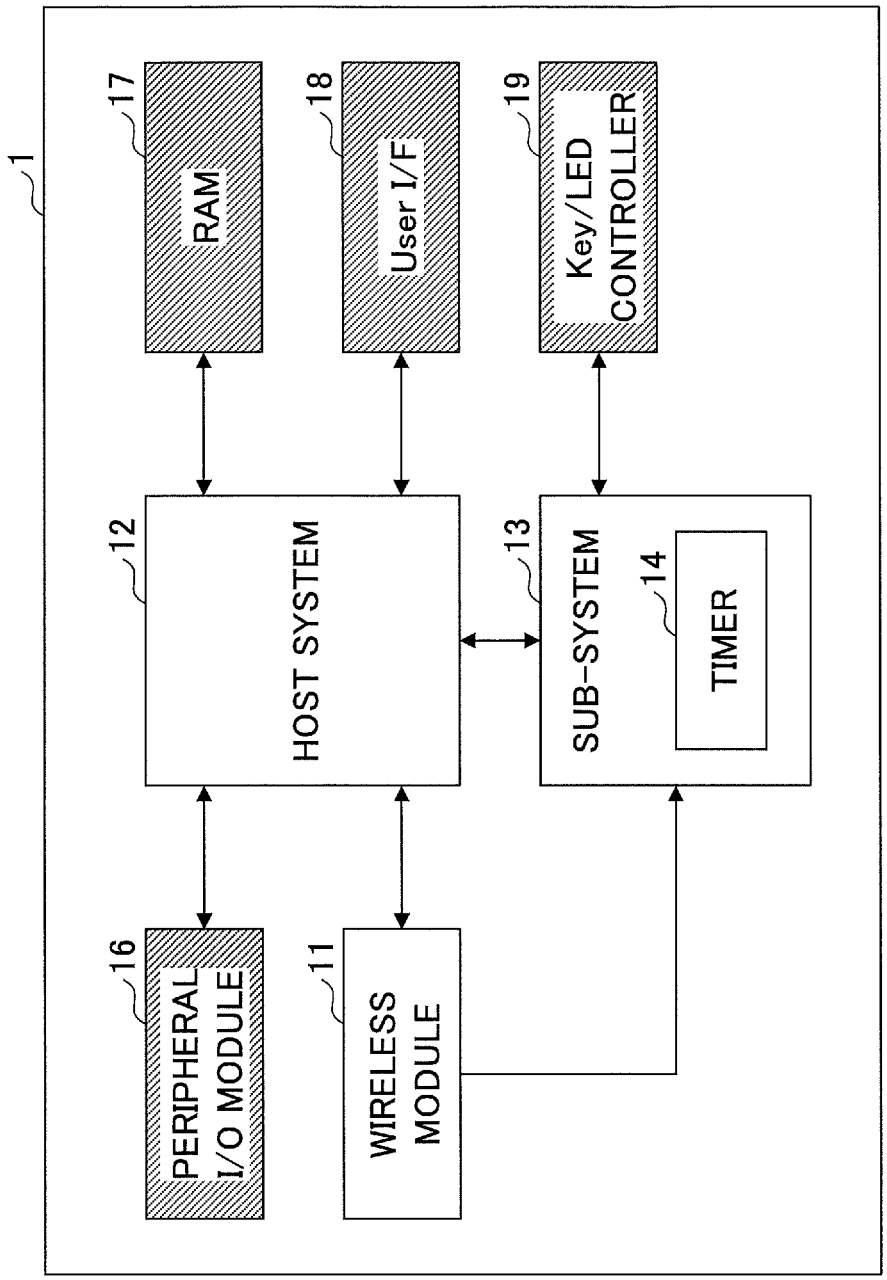
FIG. 7 illustrates an example of the configuration of the communication apparatus while executing the updating process according to the first embodiment of the present invention.

FIG. 7 illustrates an example of the configuration of the communication apparatus 1 when the host system 12 has been caused to return to the regular mode while executing the updating process. As illustrated in FIG. 7, when the host system 12 is caused to return to the regular mode, the communication control unit 122 and the updating unit 123 also return to the regular mode. In this way, in the updating process, the host system 12 is caused to return to the regular mode while the other elements (the peripheral I/O module 16, etc.) are not caused to return to the regular mode, and therefore the power consumption by the updating process can be reduced. Note that the operation status control unit 121 may cause the entire communication apparatus 1 to return to the regular mode from the energy saving mode in step S202.

In step S202, when the host system 12 returns to the regular mode, as described above, the updating unit 123 also returns to the regular mode. As illustrated in FIG. 6, when the updating unit 123 returns to the regular mode, the updating unit 123 updates the random address (step S203), and reports the updated random address to the wireless module 11 (step S204). The method of updating the random address is as described above. Subsequently, the wireless module 11 transmits the AdvP including the updated new random address. Furthermore, the sub-system 13 monitors the measurement time of the timer 14, and starts measuring the elapsed time from the present updating timing.

The operation status control unit 121 waits for a predetermined time period to elapse, after the updating unit 123 reports the random address to the wireless module 11 (NO in step S205). When a predetermined time period elapses (YES in step S205), the operation status control unit 121 causes the host system 12 to shift from the regular mode to the energy saving mode (step S206). Accordingly, the communication apparatus 1 shifts to the energy saving mode as illustrated in FIG. 5, and the updating process is ended.

Conversely, when the communication apparatus 1 is not in the energy saving mode at the starting time point of the updating process (NO in step S201), the sub-system 13 reports to the updating unit 123 that the updating time period has elapsed from the previous updating timing (step S207). The subsequent processes are the same as those of steps S203 through S206 described above.

When the updating time period elapses from the present updating timing, the sub-system 13 executes the next updating process. The present updating timing may be the starting time of the updating process or the ending time of the updating process.

Figure 8:
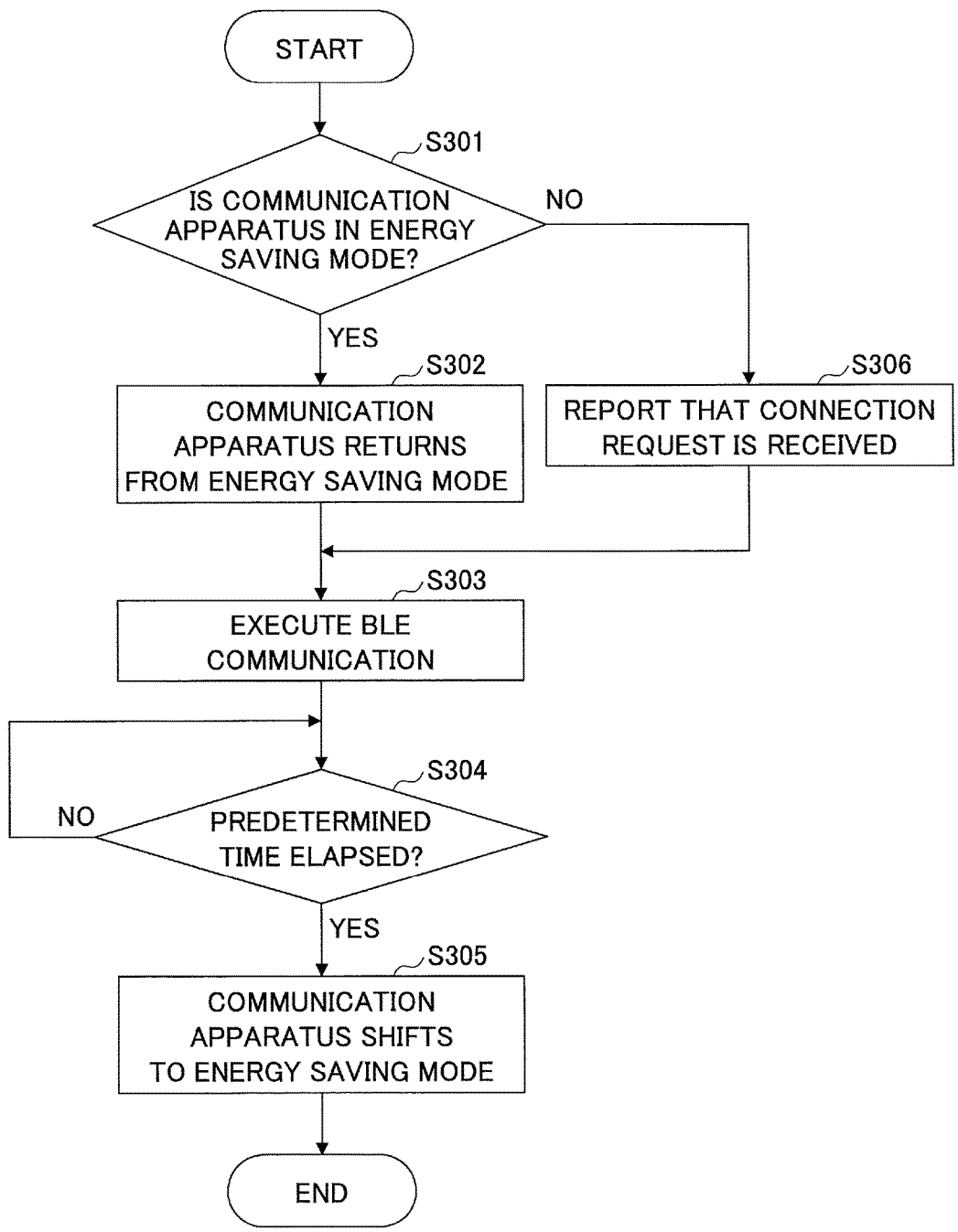
FIG. 8 is a flowchart of an example of a communication process according to the first embodiment of the present invention.

FIG. 8 is a flowchart of an example of a communication process by the communication apparatus 1 according to the present embodiment. The wireless module 11 periodically transmits the AdvP, and waits to receive a response (connection request) from the communication terminal 2 in response to the AdvP. When the wireless module 11 receives a connection request from the communication terminal 2, the wireless module 11 starts the communication process of FIG. 8.

When the communication apparatus 1 is in the energy saving mode at the starting time point of the communication process (YES in step S301), the wireless module 11 issues a wake-up interruption to the sub-system 13. When the sub-system 13 accepts this wake-up interruption, the sub-system 13 issues a wake-up interruption to the operation status control unit 121. When the operation status control unit 121 accepts this wake-up interruption, the operation status control unit 121 causes the communication apparatus 1 to return to the regular mode from the energy saving mode (step S302). Note that a case where the communication apparatus 1 is in the energy saving mode at the starting time point of the communication process, includes a case where a communication process has started while executing the updating process.

When the communication apparatus 1 returns to the regular mode, the communication control unit 122 controls the wireless module 11 to execute BLE communication with the communication terminal 2 (step S303).

After the BLE communication between the communication apparatus 1 and the communication terminal 2 is ended, the operation status control unit 121 waits until a predetermined time period elapses (NO in step S304). When a predetermined time period elapses (YES in step S304), the operation status control unit 121 causes the communication apparatus 1 to shift from the regular mode to the energy saving mode (step S305). Accordingly, the communication apparatus 1 shifts to the energy saving mode as illustrated in FIG. 5, and the communication process is ended.

Conversely, when the communication apparatus 1 is not in the energy saving mode at the starting time point of the communication process (NO in step S301), the wireless module 11 reports to the communication control unit 122 that the connection request has been received (step S306). The subsequent processes are the same as steps S303 through S305 described above.

As described above, according to the present embodiment, the communication apparatus 1 is able to shift to the energy saving mode. In the energy saving mode, some of the functions of the host system 12 (the communication control unit 122 and the updating unit 123, etc.) may be stopped, or the power of the elements corresponding to these functions may be turned off. Therefore, by the energy saving mode, the power consumption of the communication apparatus 1 can be reduced.

Furthermore, according to the present embodiment, the updating unit 123 may update the random address of the BLE at predetermined updating timings, and report the updated random address to the wireless module 11. As the wireless module 11 transmits the AdvP including the random address reported from the updating unit 123, the communication apparatus 1 is able to execute BLE communication with the communication terminal 2.

As a result, according to the present embodiment, it is possible to implement the communication apparatus 1 that is capable of shifting to the energy saving mode and also capable of executing BLE communication with the communication terminal 2.

Second Embodiment

Figure 9:
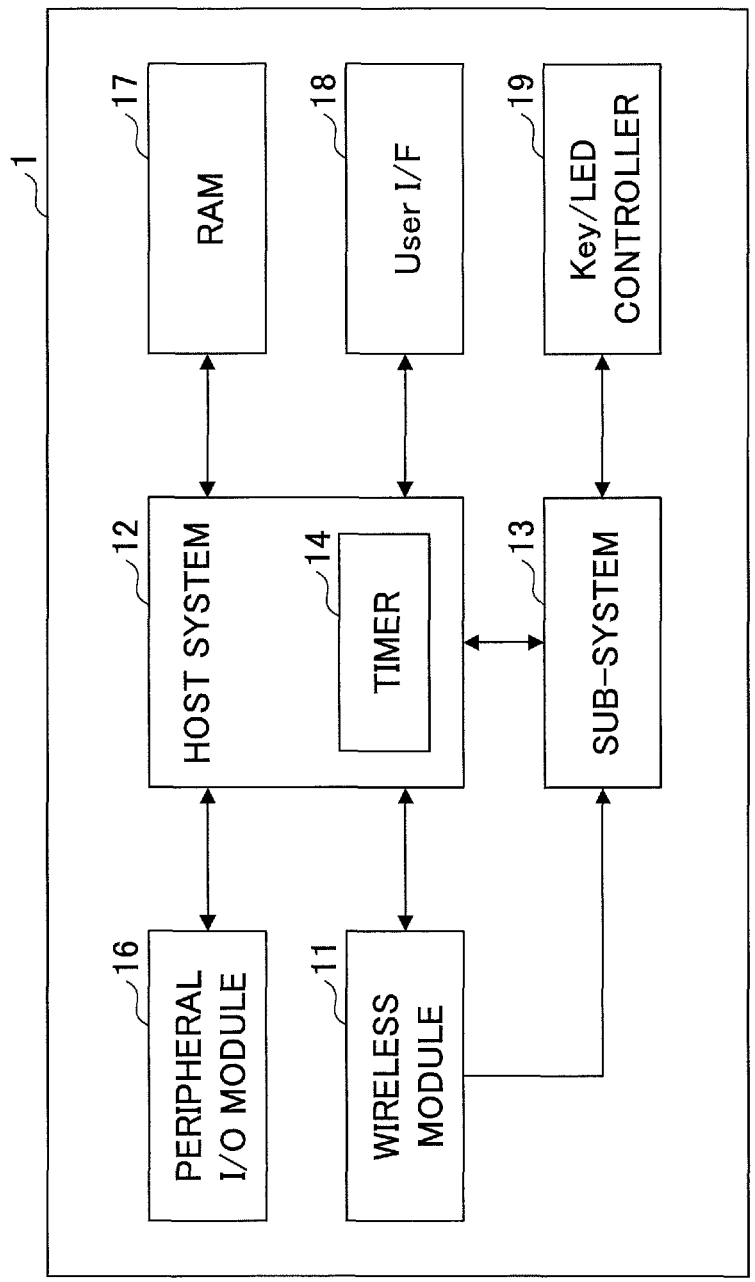
FIG. 9 illustrates an example of the configuration of the communication apparatus according to a second embodiment of the present invention.
Figure 10:
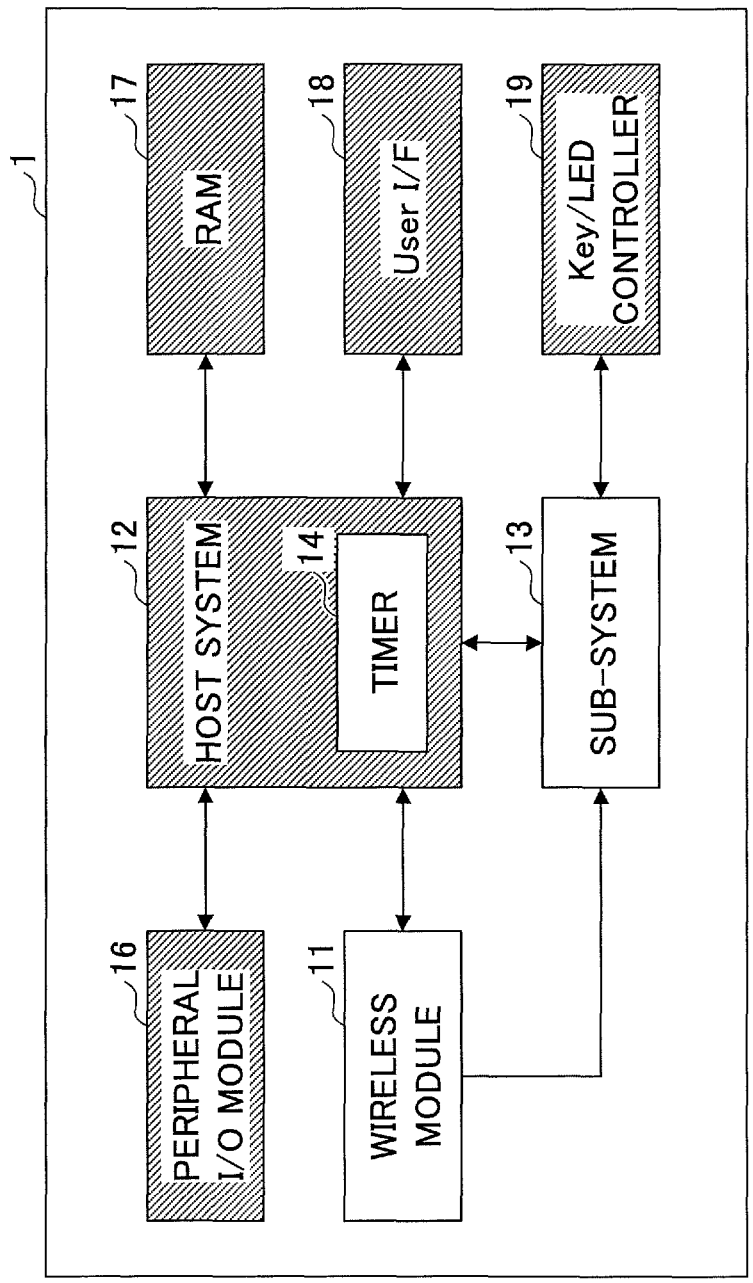
FIG. 10 illustrates an example of the configuration of the communication apparatus in the energy saving mode according to the second embodiment of the present invention.

A description is given of the communication apparatus 1 according to a second embodiment, by referring to FIGS. 9 and 10. FIG. 9 illustrates an example of the configuration of the communication apparatus 1 according to the present embodiment. As illustrated in FIG. 9, in the communication apparatus 1 according to the present embodiment, the timer 14 is provided in the host system 12. For example, the timer 14 is implemented by an RTC, etc., installed in the host system 12. Other configurations are the same as those of the first embodiment. In the following, a description is given of the different points from the first embodiment.

FIG. 10 illustrates an example of the configuration of the communication apparatus 1 in the energy saving mode. In the example of FIG. 10, the elements shaded with diagonal lines are in the energy saving mode, and the elements that are not shaded with diagonal lines are in the regular mode.

In the present embodiment, as illustrated in FIG. 10, the host system 12 in the energy saving mode accepts a wake-up interruption from the sub-system 13 by the operation status control unit 121, and measures the time by the timer 14. Furthermore, other functions of the host system 12 (the communication control unit 122 and the updating unit 123) are stopped. The timer 14 preferably has a separate power source from that of the host system 12.

Next, a description is given of the operations of the communication apparatus 1 according to the present embodiment. The process of updating the random address and the communication process by the communication apparatus 1 according to the present embodiment are the same as those of the first embodiment. However, in the present embodiment, the sub-system 13 monitors the measurement time of the timer 14 that is provided in the host system 12. The sub-system 13 may monitor the measurement time by periodically sending a request to the timer 14 to acquire the measurement time. Alternatively, the timer 14 may report the measurement time to the sub-system 13 at predetermined timings.

As described above, according to the present embodiment, similar to the first embodiment, it is possible to implement the communication apparatus 1 that is capable of shifting to the energy saving mode and also capable of executing BLE communication with the communication terminal 2.

Third Embodiment

Figure 11:
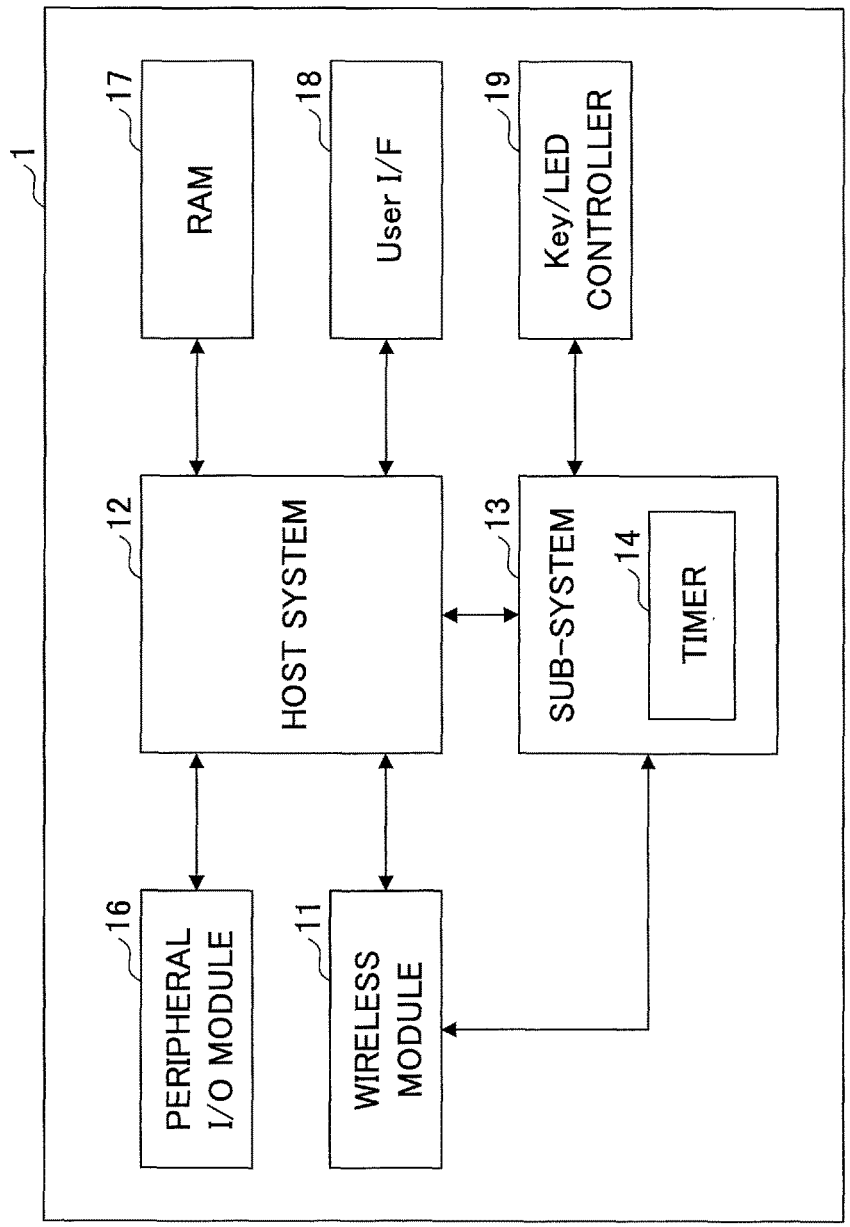
FIG. 11 illustrates an example of the configuration of the communication apparatus according to a third embodiment of the present invention.
Figure 12:
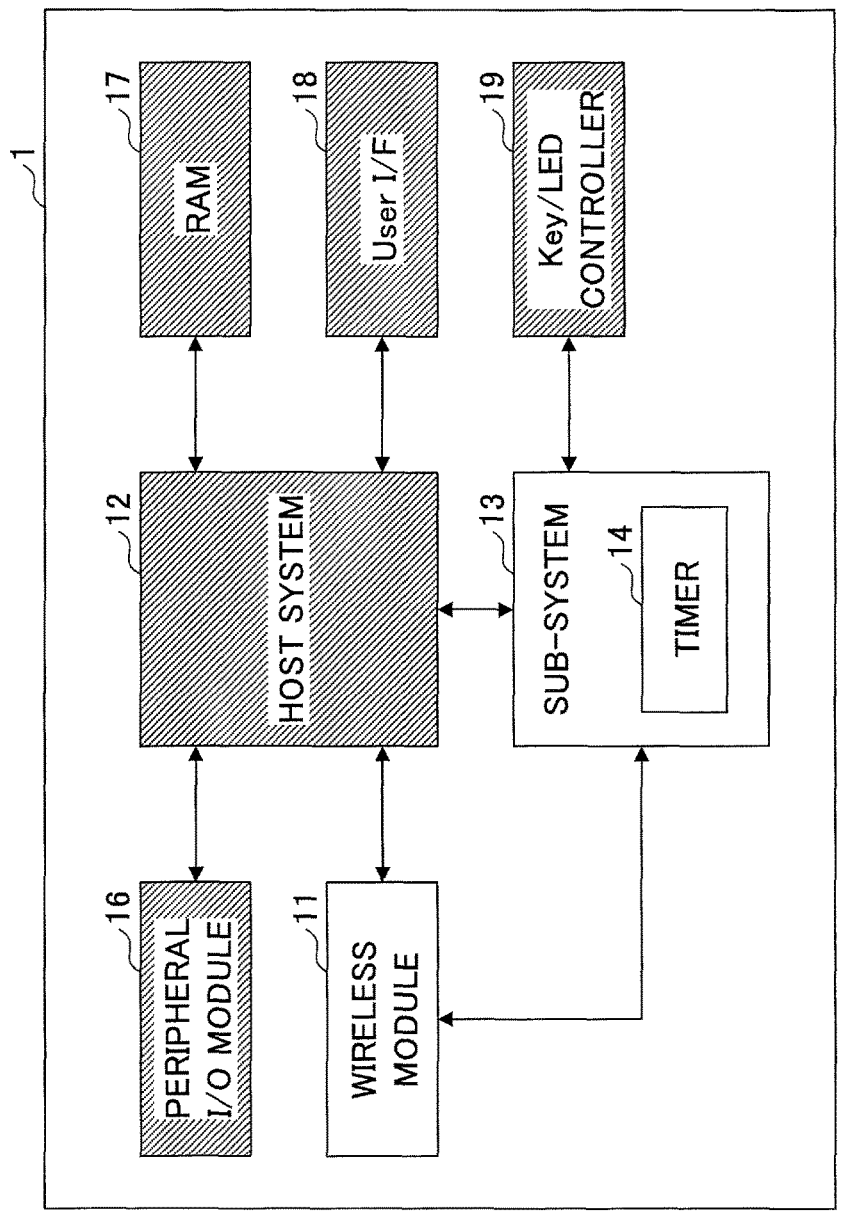
FIG. 12 illustrates an example of the configuration of the communication apparatus in the energy saving mode according to the third embodiment of the present invention.
Figure 13:
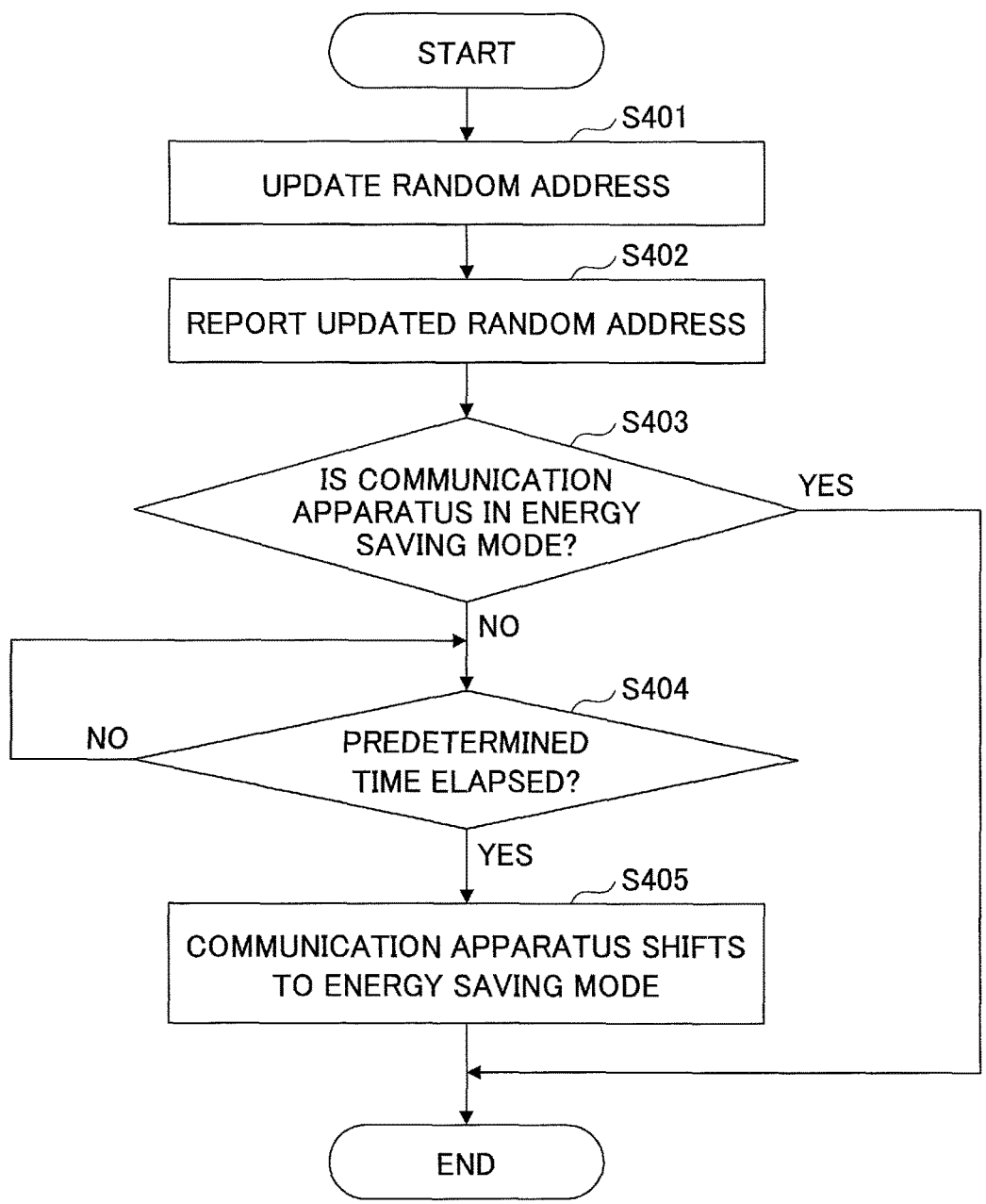
FIG. 13 is a flowchart of an example of a process of updating the random address according to the third embodiment of the present invention.

A description is given of the communication apparatus 1 according to a third embodiment, by referring to FIGS. 11 through 13. FIG. 11 illustrates an example of the configuration of the communication apparatus 1 according to the present embodiment. In the communication apparatus 1 according to the present embodiment, the updating unit 123 is provided in the sub-system 13, and the random address, which is updated by the updating unit 123, is reported to the wireless module 11. Other configurations are the same as those of the first embodiment. In the following, a description is given of the different points from the first embodiment.

FIG. 12 illustrates an example of the configuration of the communication apparatus 1 in the energy saving mode. In the example of FIG. 12, the elements shaded with diagonal lines are in the energy saving mode, and the elements that are not shaded with diagonal lines are in the regular mode.

In the present embodiment, as illustrated in FIG. 12, when the communication apparatus 1 is in the energy saving mode, the wireless module 11, the sub-system 13, and the timer 14 operate in the regular mode. Conversely, the host system 12, the peripheral I/O module 16, the RAM 17, the user I/F 18, and the key/LED controller 19 are in the energy saving mode.

The host system 12 in the energy saving mode only accepts a wake-up interruption from the sub-system 13 by the operation status control unit 121, and other functions (the communication control unit 122) of the host system 12 are stopped.

Next, a description is given of operations of the communication apparatus 1 according to the present embodiment. The communication process by the communication apparatus 1 according to the present embodiment is the same as that of the first embodiment. In the following, a description is given of a process of updating the random address by the communication apparatus 1.

FIG. 13 is a flowchart of an example of a process of updating the random address by the communication apparatus 1 according to the present embodiment. The sub-system 13 monitors the measurement time of the timer 14, and when a predetermined updating time period has elapsed from the previous updating timing, the updating process of FIG. 13 is started.

When the updating process is started, the updating unit 123 updates the random address (step S401), and reports the updated random address to the wireless module 11 (step S402). The method of updating the random address is as described above. Subsequently, the wireless module 11 transmits the AdvP including the updated new random address.

When the communication apparatus 1 is in the energy saving mode at the starting time point of the updating process (YES in step S403), the updating process is ended.

Conversely, when the communication apparatus 1 is in not the energy saving mode at the starting time point of the updating process (NO in step S403), the updating unit 123 reports the random address to the wireless module 11, and then the operation status control unit 121 waits until a predetermined time period elapses (NO in step S404). When a predetermined time period elapses (YES in step S404), the operation status control unit 121 causes the communication apparatus 1 to shift from the regular mode to the energy saving mode (step S405). Accordingly, the communication apparatus 1 shifts to the energy saving mode as illustrated in FIG. 12, and the updating process is ended.

When the predetermined updating time period elapses from the present updating timing, the sub-system 13 executes the next updating process. The present updating timing may be the starting time of the updating process or the ending time of the updating process.

As described above, according to the present embodiment, the updating process can be executed without causing the host system 12 to return to the regular mode from the energy saving mode. Therefore, according to the present embodiment, the power consumption of the communication apparatus 1 can be further reduced, compared to the first embodiment.

Note that in the present embodiment, the host system 12 is unable to recognize the random address updated during the energy saving mode. Therefore, when the host system 12 returns to the regular mode, it is preferable that the wireless module 11 reports the random address that is presently being used, to the host system 12.

Furthermore, in the present embodiment, the host system 12 may perform the process of updating the random address instead of the sub-system 13, while the communication apparatus 1 is in the regular mode. In this case, the updating unit 123 is to be provided in the host system 12 and the sub-system 13.

Fourth Embodiment

Figure 14:
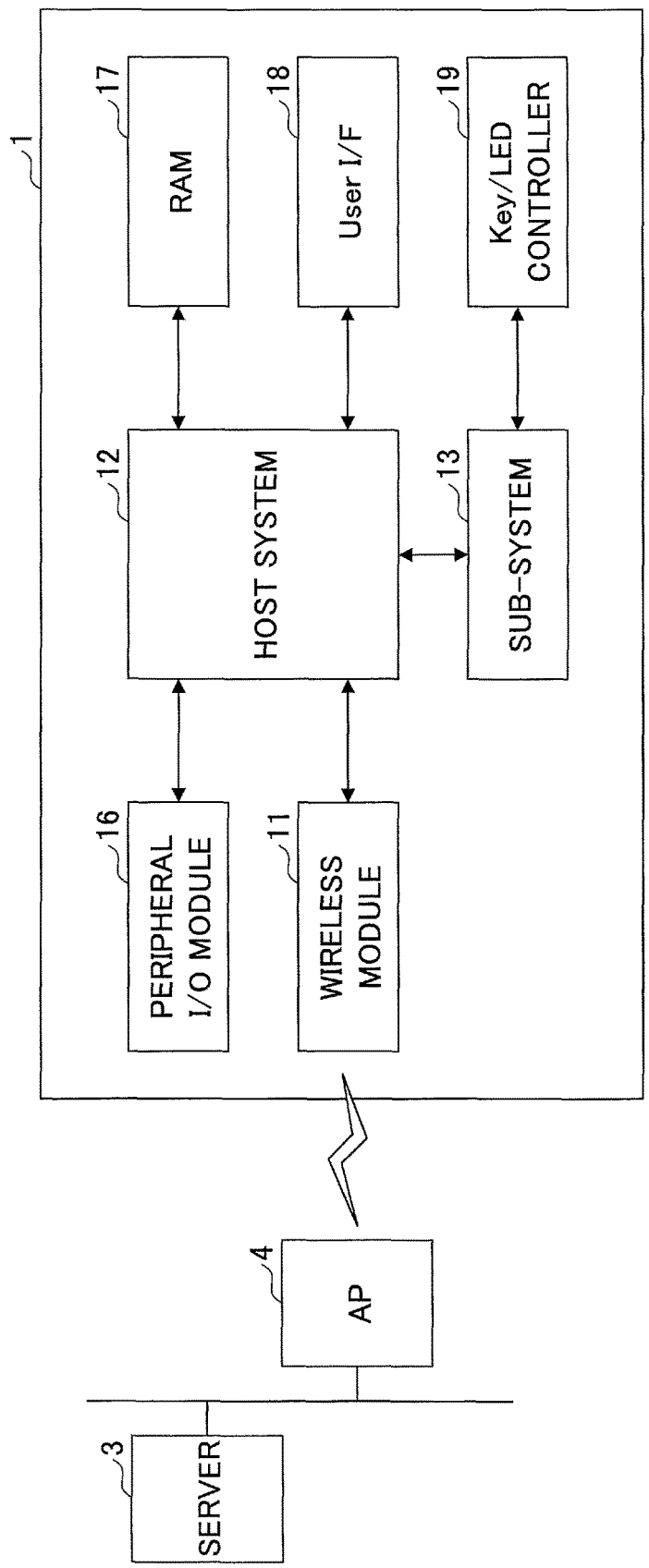
FIG. 14 illustrates an example of the configuration of a communication system according to a fourth embodiment of the present invention.
Figure 15:
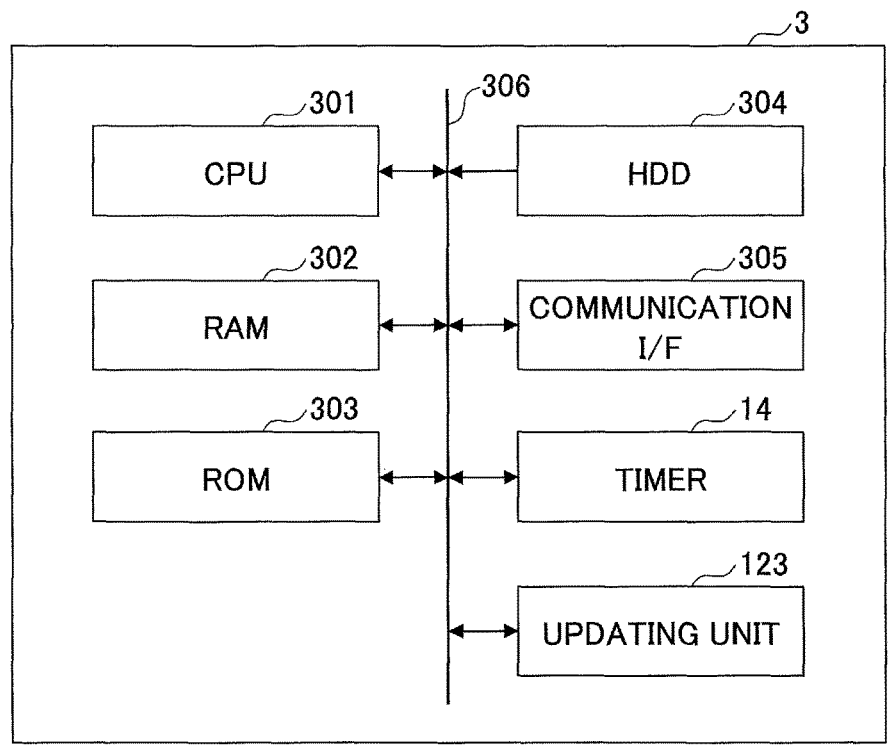
FIG. 15 illustrates an example of the configuration of a server according to the fourth embodiment of the present invention.
Figure 16:
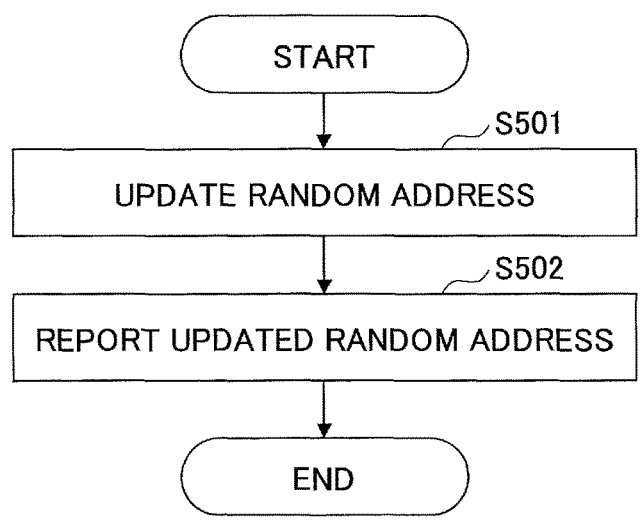
FIG. 16 is a flowchart of an example of a process of updating the random address according to the fourth embodiment of the present invention.

A description is given of a communication system according to a fourth embodiment, by referring to FIGS. 14 through 16. In the present embodiment, the timer 14 and the updating unit 123 are provided in an external server 3.

FIG. 14 illustrates an example of the configuration of the communication system according to the present embodiment. The communication system illustrated in FIG. 14 includes the communication apparatus 1, the server 3, and an access point (AP) 4. The communication apparatus 1 according to the present embodiment does not include the timer 14 or the updating unit 123. Other configurations of the communication apparatus 1 are the same as the first embodiment. In the following, a description is given of the different points from the first embodiment.

The server 3 is connected to the access point 4 via a network such as a Local Area Network (LAN). The server 3 includes the timer 14 and the updating unit 123 described in the above embodiments.

FIG. 15 illustrates an example of the configuration of the server 3 according to the present embodiment. The server 3 of FIG. 15 includes a Central Processing Unit (CPU) 301, a RAM 302, a Read Only Memory (ROM) 303, a Hard Disk Drive (HDD) 304, a communication interface (I/F) 305, the timer 14, the updating unit 123, and a bus 306.

The CPU 301 executes programs to control the units in the server 3 and implement functions of the server 3. The RAM 302 provides a work space for the CPU 301. The ROM 303 stores programs to be executed by the CPU 301. The HDD 304 stores various types of data. The communication interface 305 connects the server 3 to a network. The timer 14 is implemented by an RTC, etc., that is installed in the server 3. The updating unit 123 is implemented by an exclusive-use IC installed in the server 3. Note that the timer 14 and the updating unit 123 may be implemented as the CPU 301 executes programs. The bus 306 interconnects the CPU 301, the RAM 302, the ROM 303, the HDD 304, the communication interface 305, the timer 14, and the updating unit 123.

The access point 4 is connected to the server 3 via a network such as a LAN. The access point 4 is capable of performing communication with the wireless module 11 of the communication apparatus 1, complying with a wireless communication standard such as Wi-Fi. That is, in the example of FIG. 14, the wireless module 11 is assumed to be a combo module capable of performing communication complying with a wireless communication standard such as Wi-Fi. The access point 4 reports, in a wireless manner, the random address updated by the updating unit 123 of the server 3, to the wireless module 11 of the communication apparatus 1. That is, the server 3 according to the present embodiment communicates with the wireless module 11, via a network and the access point 4. Note that the access point 4 may be installed in the server 3.

Next, a description is given of operations of the communication system according to the present embodiment. The communication process by the communication apparatus 1 according to the present embodiment is the same as that of the first embodiment. In the following, a description is given of the process of updating the random address performed in the communication system according to the present embodiment.

FIG. 16 is a flowchart of an example of a process of updating the random address according to the present embodiment. The server 3 monitors the measurement time of the timer 14, and when a predetermined updating time period has elapsed from the previous updating timing, the updating process of FIG. 16 is started.

When the updating process is started, the updating unit 123 of the server 3 updates the random address (step S501), and reports the updated random address to the wireless module 11 via the access point 4 (step S502). The method of updating the random address is as described above. Subsequently, the wireless module 11 transmits the AdvP including the updated new random address. In the present embodiment, the updating process ends here.

As described above, according to the present embodiment, the updating process can be executed without causing the host system 12 to return to the regular mode from the energy saving mode. Therefore, according to the present embodiment, the power consumption of the communication apparatus 1 can be further reduced, compared to the first embodiment.

Note that in the present embodiment, the host system 12 is unable to recognize the random address updated during the energy saving mode. Therefore, when the host system 12 returns to the regular mode, it is preferable that the wireless module 11 reports the random address that is presently being used, to the host system 12.

Furthermore, in the present embodiment, the host system 12 may perform the process of updating the random address instead of the sub-system 13, while the communication apparatus 1 is in the regular mode. In this case, the updating unit 123 is to be provided in the host system 12.

Furthermore, in the present embodiment, the communication system may include a BLE device and a Bluetooth device, instead of the access point 4. By such a configuration, the server 3 can report the updated random address to the wireless module 11 of the communication apparatus 1, via the BLE device and the Bluetooth device.

Furthermore, in the present embodiment, the wireless module 11 may send, to the host system 12, a report that the random address has been reported from the server 3. Accordingly, the operation status control unit 121 can implement the control (steps S404 and S405 of FIG. 13) of causing the communication apparatus 1 to shift to the energy saving mode, when a predetermined time period has elapsed after the updating process has ended.

Fifth Embodiment

Figure 17:
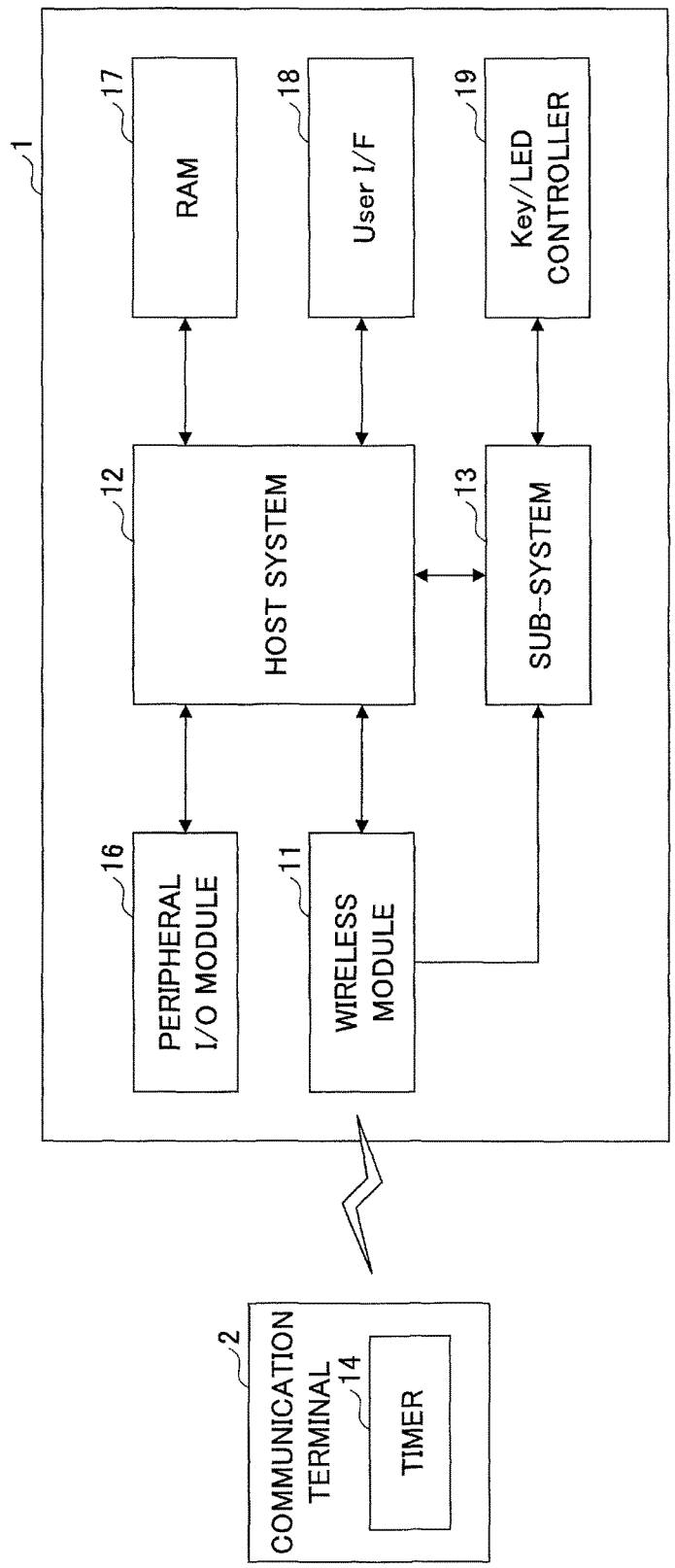
FIG. 17 illustrates an example of the configuration of the communication system according to a fifth embodiment of the present invention.
Figure 18:
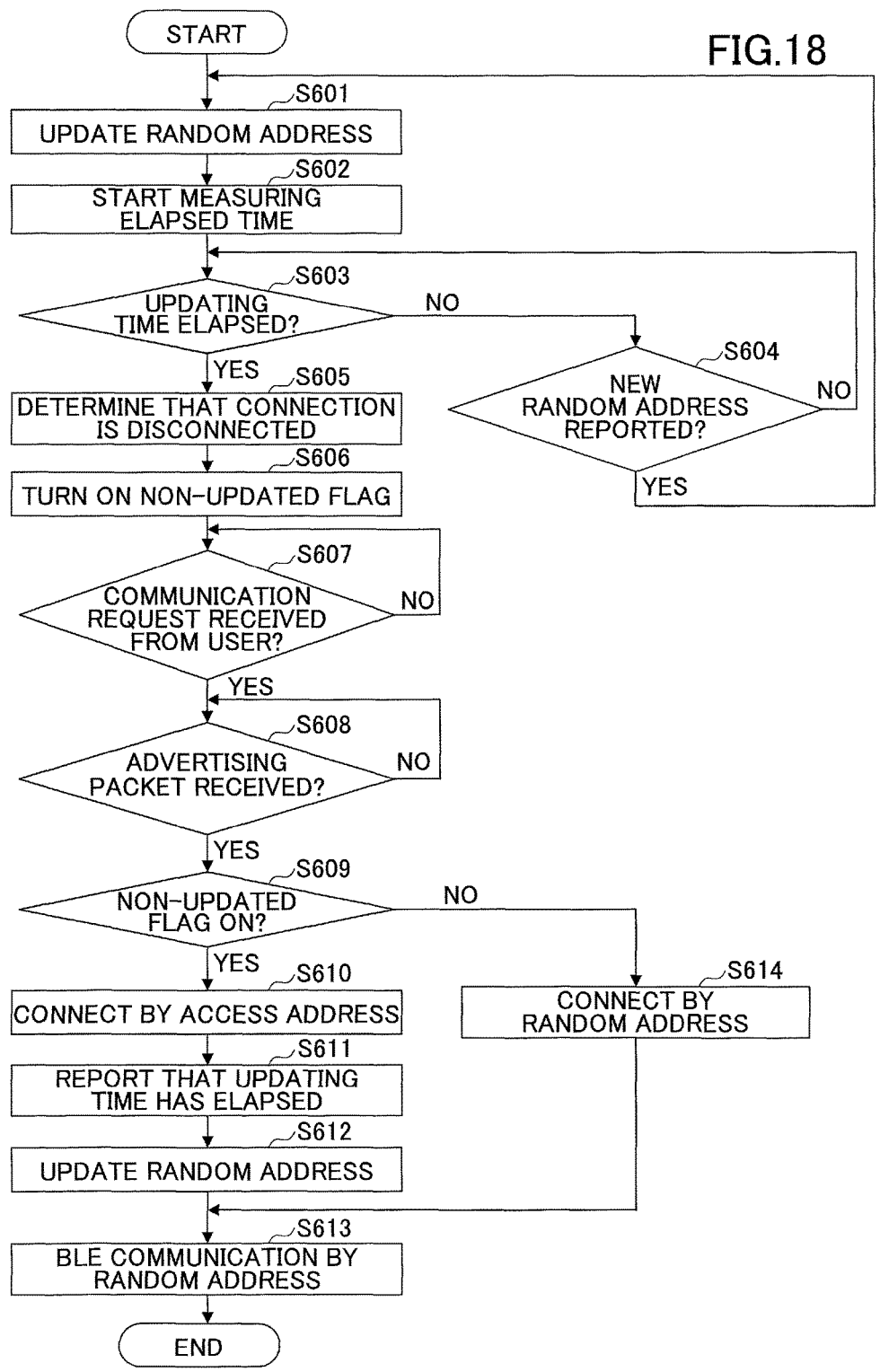
FIG. 18 is a flowchart of an example of a process executed by the communication terminal according to the fifth embodiment of the present invention.

A description is given of a communication system according to a fifth embodiment, by referring to FIGS. 17 through 19. In the above embodiments, a description is given of a communication system in which the communication apparatus 1 measures the elapsed time from the updating timing, and when an updating time period elapses, the random address is updated. However, in the present embodiment, a description is given of a communication system in which the communication terminal 2 measures the elapsed time from the updating timing, and when an updating time period elapses, the communication terminal 2 sends a report to the communication apparatus 1 that the updating time period has elapsed.

FIG. 17 illustrates an example of the configuration of the communication system according to the present embodiment. As illustrated in FIG. 17, in the present embodiment, the timer 14 is provided in the communication terminal 2. Other configurations are the same as the first embodiment.

In the following, a description is given of a process executed by the communication system according to the present embodiment. FIG. 18 is a flowchart of an example of a process executed by the communication terminal 2 according to the present embodiment. At the starting time point of the flowchart of FIG. 18, it is assumed that the communication apparatus 1 is in the regular mode, and that the communication apparatus 1 and the communication terminal 2 are executing BLE communication by using the random address of the communication apparatus 1.

In the present embodiment, the communication apparatus 1 updates the random address at updating timings, and reports the updated random address to the communication terminal 2. Specifically, the updating unit 123 updates the random address at updating timings, and the wireless module 11 reports the updated random address to the communication terminal 2. When the communication terminal 2 receives the reported new random address from the communication apparatus 1, the communication terminal 2 updates the stored random address of the communication apparatus 1, to the new random address that has been reported (step S601). That is, the communication terminal 2 stores the reported new random address as the random address of the communication apparatus 1, in association with the access address of the communication apparatus 1.

When the communication terminal 2 updates the random address, the communication terminal 2 monitors the measurement time of the timer 14, and starts measuring the elapsed time from the updating timing (step S602). The updating time period measured by the communication terminal 2 may be the same as the updating time period measured by the communication apparatus 1, or may be different from the updating time period measured by the communication apparatus 1.

Subsequently, the communication terminal 2 waits until the updating time period elapses from the updating timing in step S601, or until a new random address is reported from the communication apparatus (NO in steps S603 and step S604). During this waiting period, the communication terminal 2 may execute BLE communication with the communication apparatus 1 by using the new random address.

When a new random address is reported from the communication apparatus 1 while the communication terminal 2 is in the waiting period (YES in step S604), the process returns to step S601. For example, the process returns to step S601 when the updating time period measured by the communication terminal 2 and the updating time period measured by the communication apparatus 1 are different.

Conversely, when the updating time period elapses without a new random address being reported to the communication terminal 2 from the communication apparatus 1 (YES in step S603), the communication terminal 2 determines that the connection with the communication apparatus 1 has been disconnected (step S605). As examples of a cases where the connection has been disconnected, there is a case where the communication apparatus 1 has shifted to the energy saving mode, a case where the communication terminal 2 has moved away from the communication apparatus 1 to a distance where communication is not possible, and a case where an error has occurred in the communication apparatus 1.

When the communication terminal 2 determines that the connection with the communication apparatus 1 has been disconnected, the communication terminal 2 turns on a non-updated flag corresponding to the communication apparatus 1 (step S606). The non-updated flag is a flag that indicates whether the random address has been updated within the updating time period, and a non-updated flag is stored for each communication apparatus 1. When the non-updated flag is on, it means that the random address of the communication apparatus 1 corresponding to the non-updated flag has not been updated for more than the updating time period.

Subsequently, the communication terminal 2 waits until a request to execute BLE communication is received from the user (NO in step S607). The user can operate the input device of the communication terminal 2, to request the communication terminal 2 to execute BLE communication.

When the communication terminal 2 receives a request to execute BLE communication from the user (YES in step S607), the communication terminal 2 waits until the AdvP is received (NO in step S608). Note that when the communication terminal 2 does not receive the AdvP for a predetermined time period, the receiving process may be ended.

When the communication terminal 2 receives the AdvP (YES in step S608), the communication terminal 2 confirms whether the non-updated flag, which corresponds to the communication apparatus 1 that has transmitted the AdvP, is on (step S609). In this process, it is assumed that the communication system includes a plurality of the communication apparatuses 1. Specifically, the communication terminal 2 confirms whether the non-updated flag, which corresponds to the access address included in the received AdvP, is on.

When the non-updated flag, which corresponds to the communication apparatus 1 that has transmitted the AdvP, is on (YES in step S609), the communication terminal 2 uses the access address included in the AdvP to connect with the communication apparatus 1 (step S610). A case where the non-updated flag, which corresponds to the communication apparatus 1 that has transmitted the AdvP, is on, corresponds to a case where the communication apparatus 1 that has transmitted the AdvP, is the communication apparatus 1 with which the communication is determined to be disconnected in step S605. That is, when the communication terminal 2 is to connect with the communication apparatus 1 for which the random address has not been updated for more than the updating time period, the communication terminal 2 uses the access address of the communication apparatus 1.

When the communication terminal 2 connects with the communication apparatus 1, the communication terminal 2 reports to the communication apparatus 1 that the updating time period of the random address has elapsed (step S611). When the communication apparatus 1 receives the report that the updating time period has elapsed from the communication terminal 2, the updating unit 123 updates the random address and the wireless module 11 reports the updated new random address to the communication terminal 2.

When the communication terminal 2 receives the report of the new random address from the communication apparatus 1, the communication terminal 2 updates the stored random address of the communication apparatus 1, to the reported new random address (step S612). Specifically, the communication terminal 2 stores the reported new random address as the random address of the communication apparatus 1, in association with the access address of the communication apparatus 1.

Subsequently, the communication terminal 2 uses the updated new random address to execute BLE communication with the communication apparatus 1 (step S613). The communication terminal 2 may use the updated new random address to reconnect with the communication apparatus 1. Alternatively, the communication terminal 2 may overwrite the random address used for communication with the new random address, and continue the BLE communication with the communication apparatus 1.

Conversely, when the non-updated flag, which corresponds to the access address included in the received AdvP, is not on (NO in step S609), the communication terminal 2 uses the random address included in the AdvP to connect with the communication apparatus 1 (step S614), and uses the random address to execute BLE communication with the communication apparatus 1 (step S613). That is, when the communication terminal 2 connects with the communication apparatus 1 for which the random address has been updated within the updating time period, the communication terminal 2 uses the present random address of the communication apparatus 1 to connect with the communication apparatus 1.

FIG. 19 is a flowchart of an example of a process executed by the communication apparatus 1 according to the present embodiment. The wireless module 11 periodically transmits the AdvP, and waits to receive a response (connection request) from the communication terminal 2 in response to the AdvP. When the wireless module 11 receives a connection request from the communication terminal 2, the communication process of FIG. 19 is started.

When the communication apparatus 1 is in the energy saving mode at the starting time point of the communication process (YES in step S701), the wireless module 11 issues a wake-up interruption to the sub-system 13. When the sub-system 13 accepts this wake-up interruption, the sub-system 13 issues a wake-up interruption to the host system 12. When the operation status control unit 121 accepts this wake-up interruption, the operation status control unit 121 causes the communication apparatus 1 to return to the regular mode from the energy saving mode (step S702). At this time, the operation status control unit 121 may cause part of the elements including the host system 12 to return to the regular mode, or the operation status control unit 121 may cause the entire communication apparatus 1 to return to the regular mode.

When the communication apparatus 1 returns to the regular mode, the communication control unit 122 controls the wireless module 11, connects with the communication terminal 2 in response to polling from the communication terminal 2, and confirms whether a report, which indicates that the updating time period has elapsed, is received from the communication terminal 2 (step S703).

When a report, which indicates that the updating time period has elapsed, is received from the communication terminal 2 (YES in step S703), the communication control unit 122 reports the contents of the received report to the updating unit 123, and the updating unit 123 updates the random address (step S704). The method of updating the random address is as described above. When the updating unit 123 updates the random address, the updating unit 123 reports the random address to the wireless module 11, and the wireless module 11 reports the random address to the communication terminal 2 (step S705).

Subsequently, the communication control unit 122 controls the wireless module 11, and uses the new random address reported to the communication terminal 2, to execute BLE communication with the communication terminal 2 (step S706).

Conversely, when a report, which indicates that the updating time period has elapsed, is not received from the communication terminal 2 (NO in step S703), the communication control unit 122 controls the wireless module 11, and uses the random address presently being used, to execute BLE communication with the communication terminal 2 (step S706).

After the BLE communication with the communication terminal 2 is ended, the operation status control unit 121 waits until a predetermined time period elapses (NO in step S707). When a predetermined time period elapses (YES in step S707), the operation status control unit 121 causes the communication apparatus 1 to shift from the regular mode to the energy saving mode (step S708). Accordingly, the communication apparatus 1 shifts to the energy saving mode, and the communication process is ended.

Conversely, when the communication apparatus 1 is not in the energy saving mode at the starting time point of the communication process (NO in step S701), the wireless module 11 reports to the communication control unit 122 that a connection request has been received (step S709). The subsequent processes are the same as those of steps S703 through S708 described above.

As described above, according to the present embodiment, the communication terminal 2 measures the elapsed time from the updating timing of the random address, and when the updating time period elapses, the communication terminal 2 uses the access address to connect to the communication apparatus 1, and reports to the communication apparatus 1 that the updating time period has elapsed. When the communication apparatus 1 receives the report that the updating time period has elapsed from the communication terminal 2, the communication apparatus 1 updates the random address. Subsequently, the communication apparatus 1 and the communication terminal 2 use the updated new random address to execute BLE communication.

Accordingly, the communication apparatus 1 and the communication terminal 2 can execute BLE communication without using a random address that has not been updated for more than the updating time period, that is, the communication apparatus 1 and the communication terminal 2 can execute BLE communication by using a random address that has been updated within the updating time period. Therefore, the security of the BLE communication is increased.

Furthermore, the communication apparatus 1 can update the random address used for executing BLE communication with the communication terminal 2 without returning to the regular mode from the energy saving mode at every updating timing. Therefore, the power consumption of the communication apparatus 1 can be reduced.

Note that in the present embodiment, the sub-system 13 may include the timer 14 and measure the elapsed time from the updating timing of the random address, and report the elapsed time to the communication control unit 122. Accordingly, the communication control unit 122 can determine whether the communication terminal 2, which has made the connection request, is a legitimate communication terminal 2, based on the address used by the communication terminal 2 when making the connection request, and the elapsed time from the updating timing.

Specifically, the communication control unit 122 is to determine, as the legitimate communication terminal 2, the communication terminal 2 that has made the connection request by using the present random address within the updating time period, and the communication terminal 2 that has made the connection request by using the access address after the updating time period has elapsed. Accordingly, the communication control unit 122 is able to selectively execute BLE communication with the legitimate communication terminal 2 according to the present embodiment.

According to one embodiment of the present invention, a communication apparatus, a communication terminal, and a communication system that are capable of shifting to an energy saving mode and also capable of executing BLE communication, are provided.

The a communication apparatus, the communication terminal, and the communication system are not limited to the specific embodiments described in the detailed description, and variations and modifications may be made without departing from the spirit and scope of the present invention.

What is claimed is:
1. A communication apparatus comprising:
   a wireless module configured to execute communication with a communication terminal;
   a host system including:
     a communication controller configured to control the communication with the communication terminal executed by the wireless module;
     an updater configured to update information used for the communication, at predetermined updating timings; and
     an operation status controller configured to control an operation state, the communication apparatus further including:
   a sub-system configured to send, to the operation status controller, a report indicating that an updating time period has elapsed from the updating timing of the information, wherein
   the operation status controller causes the host system to return to a regular mode, upon receiving the report indicating that the updating time period has elapsed while the host system is in an energy saving mode.

2. The communication apparatus according to claim 1, wherein the operation status controller causes the host system to shift to the energy saving mode, upon detecting that a predetermined time period has elapsed from the updating timing of the information.

3. The communication apparatus according to claim 1, further comprising:
   a timer configured to measure an elapsed time period from the updating timing of the information.

4. The communication apparatus according to claim 1, wherein the sub-system receives the report indicating that the updating time period has elapsed, from the communication terminal.

5. The communication apparatus according to claim 1, wherein the wireless module, the sub-system, and the operation status controller operate in the regular mode, while the host system is in the energy saving mode.

6. The communication apparatus according to claim 1, wherein the communication is wireless communication complying with Bluetooth Low Energy (BLE).

7. The communication apparatus according to claim 6, wherein the information includes an Advertiser's Address of the BLE.

8. The communication terminal configured to execute the communication with the communication apparatus according to claim 1, the communication terminal comprising:
   a timer configured to measure an elapsed time period from the updating timing of the information, wherein
   the communication terminal sends the report indicating that the updating time period has elapsed, to the communication apparatus.

9. The communication terminal according to claim 8, wherein the communication terminal uses other information that is different from the information, to connect to the communication apparatus, upon detecting that the updating time period has elapsed.

10. A communication system comprising:
    the communication apparatus according to claim 1; and
    the communication terminal configured to execute the communication with the communication apparatus, the communication terminal including:
      a timer configured to measure an elapsed time period from the updating timing of the information, wherein
      the communication terminal sends the report indicating that the updating time period has elapsed, to the communication apparatus.

11. A communication system comprising:
    a communication apparatus including:
      a wireless module configured to execute communication with a communication terminal; and
      a host system including:
        a communication controller configured to control the communication with the communication terminal executed by the wireless module; and
        an operation status controller configured to control an operation state of the host system, the communication system further comprising:
    a server including:
      an updater configured to update information used for the communication, at predetermined updating timings;
    wherein the server further includes a communication interface configured to transmit the information updated by the updater to the wireless module; and wherein the operation status controller is configured, in a case in which the wireless module has received the information when the operation state of the host system is an energy saving mode, to not return the operation state of the host system to a regular mode.

\* \* \* \* \*